(12) United States Patent
Raciborski et al.

(10) Patent No.: US 8,805,966 B2
(45) Date of Patent: Aug. 12, 2014

(54) RICH CONTENT DOWNLOAD

(71) Applicant: Limelight Networks, Inc., Tempe, AZ (US)

(72) Inventors: Nathan F. Raciborski, Phoenix, AZ (US); Michael M. Gordon, Paradise Valley, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 26 days.

(21) Appl. No.: 13/671,451

(22) Filed: Nov. 7, 2012

(65) Prior Publication Data

US 2013/0139091 A1      May 30, 2013

Related U.S. Application Data

(63) Continuation-in-part of application No. 13/489,069, filed on Jun. 5, 2012, which is a continuation-in-part of (Continued)

(51) Int. Cl.
| | |
|---|---|
| *G06F 15/173* | (2006.01) |
| *H04L 29/06* | (2006.01) |
| *G06F 17/30* | (2006.01) |
| *H04L 29/08* | (2006.01) |
| *G06Q 30/02* | (2012.01) |
| *G06F 3/0484* | (2013.01) |

(52) U.S. Cl.
CPC ............ *H04L 67/06* (2013.01); *H04L 65/4084* (2013.01); *G06F 17/30058* (2013.01); *H04L 65/604* (2013.01); *H04L 65/80* (2013.01); *H04L 65/4092* (2013.01); *G06Q 30/02* (2013.01); *G06F 3/0484* (2013.01)
USPC ........................................................ 709/219

(58) Field of Classification Search
None
See application file for complete search history.

(56) References Cited

U.S. PATENT DOCUMENTS

| | | |
|---|---|---|
| 5,805,815 A | 9/1998 | Hill |
| 5,963,916 A | 10/1999 | Kaplan |

(Continued)

FOREIGN PATENT DOCUMENTS

| | | |
|---|---|---|
| EP | 1 154 611 A2 | 11/2001 |
| EP | 1309153 A1 | 5/2003 |

(Continued)

OTHER PUBLICATIONS

Image-Line, "Content Library-IL Download Manager", Retrieved on Dec. 12, 2012 from http://www.image-line.com/support/FLHelp/html/download_manager.htm, pp. 1-2.

(Continued)

*Primary Examiner* — Scott Christensen
(74) *Attorney, Agent, or Firm* — Kilpatrick Townsend & Stockton LLP

(57) ABSTRACT

According to the invention, a content download system for downloading a content file and additional content using a window is disclosed. The content download system includes a content site, a content provider and a third party. The content site presents the window that displays the download progress of the content file, presents the additional content while the content file is downloaded, and allows selection of the additional content. The content provider serves as an origin server for the content file. The third party receives information on the content file and provides the additional content.

16 Claims, 24 Drawing Sheets

Related U.S. Application Data application No. 10/958,978, filed on Oct. 4, 2004, now Pat. No. 8,209,401, said application No. 13/489,069 is a continuation-in-part of application No. 12/421,533, filed on Apr. 9, 2009, now Pat. No. 7,891,014, which is a continuation of application No. 10/935,897, filed on Sep. 7, 2004, now Pat. No. 7,536,725, which is a continuation-in-part of application No. 10/901,893, filed on Jul. 28, 2004, now Pat. No. 8,122,100, application No. 13/671,451, which is a continuation-in-part of application No. 12/502,804, filed on Jul. 14, 2009, application No. 13/671,451, which is a continuation-in-part of application No. 12/502,864, filed on Jul. 14, 2009, now abandoned, application No. 13/671,451, which is a continuation-in-part of application No. 13/004,762, filed on Jan. 11, 2011, now Pat. No. 8,336,110, which is a continuation of application No. 12/421,533, filed on Apr. 9, 2009, now Pat. No. 7,891,014, which is a continuation of application No. 10/935,897, filed on Sep. 7, 2004, now Pat. No. 7,536,725, which is a continuation-in-part of application No. 10/901,893, filed on Jul. 28, 2004, now Pat. No. 8,122,100.

(60) Provisional application No. 60/508,626, filed on Oct. 3, 2003, provisional application No. 60/500,388, filed on Sep. 5, 2003, provisional application No. 60/490,810, filed on Jul. 28, 2003, provisional application No. 61/080,597, filed on Jul. 14, 2008, provisional application No. 61/080,608, filed on Jul. 14, 2008.

(56) References Cited

U.S. PATENT DOCUMENTS

| | | | |
|---|---|---|---|
| 6,151,620 | A | 11/2000 | Madsen et al. |
| 6,223,224 | B1 | 4/2001 | Bodin |
| 6,237,006 | B1 | 5/2001 | Weinberg et al. |
| 6,256,669 | B1 | 7/2001 | Hurwitz |
| 6,289,012 | B1 | 9/2001 | Harrington |
| 6,427,140 | B1 | 7/2002 | Ginter et al. |
| 6,460,163 | B1 | 10/2002 | Bowman et al. |
| 6,463,469 | B1 | 10/2002 | Yavitz |
| 6,578,077 | B1 | 6/2003 | Rakoshitz et al. |
| 6,595,856 | B1 | 7/2003 | Ginsburg et al. |
| 6,675,212 | B1 | 1/2004 | Greenwood |
| 6,862,291 | B2 | 3/2005 | Talpade et al. |
| 6,917,923 | B1 | 7/2005 | Dimenstein |
| 6,922,782 | B1 | 7/2005 | Spyker et al. |
| 6,950,804 | B2 | 9/2005 | Strietzel |
| 6,990,630 | B2 | 1/2006 | Landsman et al. |
| 7,020,704 | B1 | 3/2006 | Lipscomb et al. |
| 7,149,958 | B2 | 12/2006 | Landsman et al. |
| 7,165,076 | B2 | 1/2007 | Bentley |
| 7,209,900 | B2 | 4/2007 | Hunter et al. |
| 7,254,622 | B2 | 8/2007 | Nomura et al. |
| 7,316,033 | B2 | 1/2008 | Risan et al. |
| 7,363,498 | B2 | 4/2008 | Hennessey et al. |
| 7,363,499 | B2 | 4/2008 | Perlman |
| 7,536,725 | B2 | 5/2009 | Raciborski |
| 7,587,512 | B2 | 9/2009 | Ta et al. |
| 7,610,352 | B2 | 10/2009 | AlHusseini et al. |
| 7,653,689 | B1 | 1/2010 | Champagne et al. |
| 7,779,035 | B2 | 8/2010 | Raciborski et al. |
| 7,891,014 | B2 | 2/2011 | Raciborski |
| 7,904,930 | B2 | 3/2011 | Dhodapkar et al. |
| 7,912,752 | B2 | 3/2011 | Subramanian |
| 7,917,855 | B1 | 3/2011 | Satish et al. |
| 7,925,973 | B2 | 4/2011 | Allaire et al. |
| 7,954,064 | B2 | 5/2011 | Forstall et al. |
| 7,954,087 | B2 | 5/2011 | Zenz et al. |
| 7,966,638 | B2 | 6/2011 | Gossweiler, III et al. |
| 8,122,100 | B2 | 2/2012 | Raciborski et al. |
| 8,230,037 | B2 | 7/2012 | Story et al. |
| RE43,601 | E | 8/2012 | Arseneau et al. |
| 8,290,542 | B2 | 10/2012 | Gosselin |
| 2001/0030660 | A1 | 10/2001 | Zainoulline |
| 2001/0039659 | A1 | 11/2001 | Simmons et al. |
| 2001/0051996 | A1 | 12/2001 | Cooper et al. |
| 2001/0051998 | A1 | 12/2001 | Henderson |
| 2002/0049909 | A1 | 4/2002 | Jackson et al. |
| 2002/0052957 | A1 | 5/2002 | Shimada |
| 2002/0071423 | A1 | 6/2002 | Mirashrafi et al. |
| 2002/0077985 | A1 | 6/2002 | Kobata et al. |
| 2002/0091848 | A1 | 7/2002 | Agresta et al. |
| 2002/0099798 | A1 | 7/2002 | Fedorovsky et al. |
| 2002/0138554 | A1 | 9/2002 | Feigen et al. |
| 2002/0138593 | A1 | 9/2002 | Novak et al. |
| 2002/0143952 | A1 | 10/2002 | Sugiarto et al. |
| 2003/0005301 | A1 | 1/2003 | Jutzi et al. |
| 2003/0014630 | A1 | 1/2003 | Spencer et al. |
| 2003/0018767 | A1 | 1/2003 | Chatani et al. |
| 2003/0078918 | A1 | 4/2003 | Souvignier et al. |
| 2003/0105835 | A1 | 6/2003 | Hori et al. |
| 2003/0110503 | A1 | 6/2003 | Perkes |
| 2003/0145316 | A1 | 7/2003 | McKinlay et al. |
| 2003/0195974 | A1 | 10/2003 | Ronning et al. |
| 2004/0019497 | A1 | 1/2004 | Volk et al. |
| 2004/0024688 | A1 | 2/2004 | Bi et al. |
| 2004/0056891 | A1 | 3/2004 | Hiratsuka |
| 2004/0064573 | A1 | 4/2004 | Leaning et al. |
| 2004/0128361 | A1* | 7/2004 | Gaffney ........................ 709/217 |
| 2004/0199809 | A1 | 10/2004 | Hanam et al. |
| 2004/0254958 | A1 | 12/2004 | Volk |
| 2005/0034151 | A1 | 2/2005 | Abramson |
| 2005/0044260 | A1 | 2/2005 | Abramson et al. |
| 2005/0114541 | A1 | 5/2005 | Ghetie et al. |
| 2005/0125660 | A1 | 6/2005 | Raciborski |
| 2005/0132083 | A1 | 6/2005 | Raciborski et al. |
| 2006/0031785 | A1* | 2/2006 | Raciborski ................... 715/859 |
| 2006/0248009 | A1 | 11/2006 | Hicks et al. |
| 2007/0038751 | A1 | 2/2007 | Jorgensen |
| 2007/0150892 | A1 | 6/2007 | Chaney |
| 2007/0184820 | A1 | 8/2007 | Marshall |
| 2007/0204011 | A1 | 8/2007 | Shaver et al. |
| 2007/0204057 | A1 | 8/2007 | Shaver et al. |
| 2007/0256003 | A1 | 11/2007 | Wagoner et al. |
| 2008/0126887 | A1 | 5/2008 | Brodeur et al. |
| 2008/0313302 | A1 | 12/2008 | Heyworth et al. |
| 2009/0201946 | A1 | 8/2009 | Killick et al. |
| 2009/0319681 | A1 | 12/2009 | Freelander et al. |
| 2010/0011093 | A1* | 1/2010 | Gordon ........................ 709/219 |
| 2010/0057884 | A1 | 3/2010 | Brownell et al. |
| 2010/0333028 | A1 | 12/2010 | Welsh et al. |

FOREIGN PATENT DOCUMENTS

| | | |
|---|---|---|
| EP | 2472860 A1 | 7/2012 |
| WO | 9700480 A1 | 1/1997 |
| WO | 111466 A2 | 2/2001 |

OTHER PUBLICATIONS

PACNET, "Pacnet CDN", Retrieved on Dec. 12, 2012 from http://www.pacnet.com/enterprise/managed-services/cdn/, pp. 1-2.

Author Unknown, "server," Whatis.com, Jun. 10, 2011, 1 page. Retrieved on Jul. 3, 2013 from: http://whatis.techtarget.com/definition/server?vgnextfmt=print.

Author Unknown, "Mouse Runner's Firefox Guide", mouserunner.com, Jul. 5, 2007, pp. 1-3. Retrieved on Feb. 28, 2012 from: http://web.archive.org/web/20070705225241/http://www.mouserunner.com/FF_Tips_Multiple_Fx.html.

Author Unknown, "Firefox 2: Download the New Firefox Web Browser," Jun. 2, 2008, pp. 1-7. Retrieved on Sep. 6, 2011 from: http://web.archive.org/web/20080602014811/http://support.mozilla.com/en-US/kb/Customizing+your+Firefox+with+add+ons.

Cherry, S.M., "Making music pay," Media, IEEE Spectrum, vol. 38, Issue 10, Oct. 2001, pp. 41-46.

(56) References Cited

OTHER PUBLICATIONS

Hipson, P., "Firefox and Thunderbird: Beyond Browsing and Email," Oct. 27, 2005, Que, pp. 1-22.
Pash, A., "Cap Your Browsing Bandwidth with Firefox Throttle", Feb. 29, 2008, 1 page. Retrieved on Feb. 28, 2012 from: http://lifehacker.com/362512/cap-your-browsing-bandwidth-with-firefox-throttle.
U.S. Appl. No. 10/901,893, Advisory Action mailed Nov. 6, 2008, 3 pages.
U.S. Appl. No. 10/901,893, Advisory Action mailed Nov. 15, 2010, 4 pages.
U.S. Appl. No. 10/901,893, Amendment after Final, filed Aug. 16, 2010, 11 pages.
U.S. Appl. No. 10/901,893, Amendment after Final, filed Nov. 1, 2010, 12 pages.
U.S. Appl. No. 10/901,893, Amendment after Non-Final Rejection, filed Apr. 18, 2008, 12 pages.
U.S. Appl. No. 10/901,893, Amendment after Non-Final Rejection, filed Oct. 11, 2011, 10 pages.
U.S. Appl. No. 10/901,893, Amendment after Non-Final Rejection, filed Oct. 20, 2008, 10 pages.
U.S. Appl. No. 10/901,893, Amendment after Non-Final Rejection, filed Dec. 18, 2009, 9 pages.
U.S. Appl. No. 10/901,893, Appeal Brief, filed Apr. 15, 2011, 18 pages.
U.S. Appl. No. 10/901,893, Final Office Action mailed Apr. 14, 2010, 13 pages.
U.S. Appl. No. 10/901,893, Final Office Action mailed Aug. 20, 2008, 15 pages.
U.S. Appl. No. 10/901,893, Final Office Action mailed Aug. 31, 2010, 13 pages.
U.S. Appl. No. 10/901,893, Notice of Allowance mailed Jan. 5, 2012, 7 pages.
U.S. Appl. No. 10/901,893, Office Action mailed Jul. 12, 2011, 11 pages.
U.S. Appl. No. 10/901,893, Office Action mailed Oct. 2, 2009, 13 pages.
U.S. Appl. No. 10/901,893, Office Action mailed Dec. 18, 2007, 13 pages.
U.S. Appl. No. 10/901,893, Pre-Brief Appeal Conference decision, filed Feb. 15, 2011, 2 pages.
U.S. Appl. No. 10/901,893, Pre-Brief Conference Request, filed Dec. 30, 2010, 5 pages.
U.S. Appl. No. 10/901,893, Request for Continued Examination and Amendment, filed Dec. 22, 2008, 13 pages.
U.S. Appl. No. 10/935,837, Amendment after Final Rejection, filed Apr. 22, 2008, 12 pages.
U.S. Appl. No. 10/935,837, Amendment after Non-Final Rejection, filed Jan. 7, 2008, 13 pages.
U.S. Appl. No. 10/935,837, Amendment after Non-Final Rejection, filed Nov. 21, 2008, 14 pages.
U.S. Appl. No. 10/935,837, Final Office Action mailed Feb. 22, 2008, 17 pages.
U.S. Appl. No. 10/935,837, Notice of Allowance mailed Jan. 14, 2009, 7 pages.
U.S. Appl. No. 10/935,837, Office Action mailed Jul. 28, 2008, 13 pages.
U.S. Appl. No. 10/935,837, Office Action mailed Oct. 5, 2007, 16 pages.
U.S. Appl. No. 10/958,978, Advisory Action mailed Mar. 1, 2010, 7 pages.
U.S. Appl. No. 10/958,978, Amendment after Final Rejection, filed Feb. 9, 2010, 6 pages.
U.S. Appl. No. 10/958,978, Amendment after Non-Final Rejection, filed Feb. 6, 2012, 10 pages.
U.S. Appl. No. 10/958,978, Amendment after Non-Final Rejection, filed Jun. 5, 2008, 13 pages.
U.S. Appl. No. 10/958,978, Amendment after Non-Final Rejection, filed Aug. 3, 2009, 11 pages.
U.S. Appl. No. 10/958,978, Amendment after Non-Final Rejection, filed Oct. 21, 2010, 11 pages.
U.S. Appl. No. 10/958,978, Amendment and Request for Continued Examination after Advisory Action, filed May 7, 2010, 12 pages.
U.S. Appl. No. 10/958,978, Amendment and Request for Continued Examination after Advisory Action, filed Jun. 20, 2011, 13 pages.
U.S. Appl. No. 10/958,978, Final Office Action mailed Jan. 19, 2011, 17 pages.
U.S. Appl. No. 10/958,978, Final Office Action mailed Dec. 7, 2009, 13 pages.
U.S. Appl. No. 10/958,978, Notice of Allowance mailed Mar. 23, 2012, 10 pages.
U.S. Appl. No. 10/958,978, Office Action mailed Mar. 10, 2008, 14 pages.
U.S. Appl. No. 10/958,978, Office Action mailed Apr. 1, 2009, 12 pages.
U.S. Appl. No. 10/958,978, Office Action mailed Jul. 21, 2010, 13 pages.
U.S. Appl. No. 10/958,978, Office Action mailed Nov. 4, 2011, 16 pages.
U.S. Appl. No. 12/421,533, Amendment after Non-Non-Final Rejection, filed Nov. 1, 2010, 12 pages.
U.S. Appl. No. 12/421,533, Notice of Allowance mailed Dec. 10, 2010, 7 pages.
U.S. Appl. No. 12/421,533, Office Action mailed Sep. 17, 2010, 6 pages.
U.S. Appl. No. 12/502,804, Advisory Action mailed Nov. 15, 2011, 3 pages.
U.S. Appl. No. 12/502,804, Amendment after Non-Final Rejection, filed May 16, 2011, 9 pages.
U.S. Appl. No. 12/502,804, Amendment after Non-Final Rejection, filed Nov. 15, 2011, 12 pages.
U.S. Appl. No. 12/502,804, Final Office Action mailed Jul. 20, 2011, 19 pages.
U.S. Appl. No. 12/502,804, Office Action mailed Feb. 15, 2011, 10 pages.
U.S. Appl. No. 12/502,804, Request for Continued Examination, filed Nov. 28, 2011, 1 page.
U.S. Appl. No. 12/502,864, Amendment after Non-Final Rejection, filed Jun. 6, 2012, 13 pages.
U.S. Appl. No. 12/502,864, Amendment after Non-Final Rejection, filed Jun. 29, 2011, 11 pages.
U.S. Appl. No. 12/502,864, Amendment after Non-Final Rejection, filed Dec. 16, 2011, 12 pages.
U.S. Appl. No. 12/502,864, Final Office Action mailed Jun. 27, 2012, 20 pages.
U.S. Appl. No. 12/502,864, Office Action mailed Mar. 6, 2012, 21 pages.
U.S. Appl. No. 12/502,864, Office Action mailed Apr. 4, 2011, 17 pages.
U.S. Appl. No. 12/502,864, Office Action mailed Sep. 16, 2011, 18 pages.
U.S. Appl. No. 12/502,864, Pre-Brief Appeal Conference Decision, filed Sep. 18, 2012, 2 pages.
U.S. Appl. No. 12/502,864, Pre-Brief Conference Request, filed Sep. 5, 2012, 6 pages.
U.S. Appl. No. 13/004,762, Notice of Allowance mailed Nov. 5, 2012, 11 pages.
U.S. Appl. No. 13/004,762, Preinterview Office Action mailed Sep. 21, 2012, 4 pages.
Waller et al., "Securing the delivery of digital content over the Internet", Electronics & Communication Engineering Journal vol. 14, Issue 5, Oct. 2002, pp. 239-248.
Yeow, C., "Firefox Secrets", Jun. 2005, Sitepoint, pp. 1-297. Abstract Only.

* cited by examiner

RICH CONTENT DOWNLOAD

CROSS-REFERENCE TO RELATED APPLICATIONS

This application is a continuation-in-part of U.S. application Ser. No. 13/489,069 filed Jun. 5, 2012, which is a continuation-in-part of U.S. application Ser. No. 10/958,978 filed Oct. 4, 2004, which claims the benefit and priority of U.S. Provisional Application Ser. No. 60/508,626 filed on Oct. 3, 2003. U.S. application Ser. No. 13/489,069 is also a continuation-in-part of U.S. application Ser. No. 12/421,533 filed Apr. 9, 2009, which is a continuation of U.S. application Ser. No. 10/935,897 filed Sep. 7, 2004, which claims the benefit and priority of U.S. Application Ser. No. 60/500,388 filed on Sep. 5, 2003 and also is a continuation-in-part of U.S. application Ser. No. 10/901,893 filed on Jul. 28, 2004, which claims the benefit and priority of U.S. Application Ser. No. 60/490,810 filed on Jul. 28, 2003 and U.S. Application Ser. No. 60/508,626 filed on Oct. 3, 2003.

This application is a continuation-in-part of U.S. application Ser. No. 12/502,804 filed Jul. 14, 2009, which claims the benefit and priority of U.S. Application Ser. No. 61/080,597 filed on Jul. 14, 2008.

This application is a continuation-in-part of U.S. application Ser. No. 12/502,864 filed Jul. 14, 2009, which claims the benefit and priority of U.S. Application Ser. No. 61/080,608 filed on Jul. 14, 2008.

This application is related to U.S. patent application Ser. No. 10/936,446, filed on Sep. 7, 2004, entitled "MANAGEMENT OF DIGITAL CONTENT LICENSES".

Each of the above-listed applications is hereby incorporated by reference in its entirety for all purposes.

This application is a continuation-in-part of U.S. application Ser. No. 13/004,762 filed Jan. 11, 2011, which is a continuation of U.S. application Ser. No. 12/421,533 filed Apr. 9, 2009, which is a continuation of U.S. application Ser. No. 10/935,897 filed Sep. 7, 2004, which claims the benefit and priority of U.S. Application Ser. No. 60/500,388 filed on Sep. 5, 2003 and also is a continuation-in-part of U.S. application Ser. No. 10/901,893 filed on Jul. 28, 2004, which claims the benefit and priority of U.S. Application Ser. No. 60/490,810 filed on Jul. 28, 2003, U.S. Application Ser. No. 60/508,626 filed on Oct. 3, 2003 and U.S. Application Ser. No. 60/500,388 filed on Sep. 5, 2003.

BACKGROUND

This disclosure relates in general to content delivery and, more specifically, but not by way of limitation, to downloading of content.

Today, content files are downloaded from services for playback from a computer hard drive or media player. In some cases, certain song files can be used to produce compact disks (CDs) for playback in any CD player. With some download services, digital rights management (DRM) is used to protect the file after download such that usage is restricted in predefined ways. During the download, the customer simply waits for the process to complete before accessing the content. Some players allow streaming playback of content instead of using the download before playing model.

Theft of copyrighted content on the Internet is rampant. Some have postulated that theft of content can only be remedied by legal alternatives. The legal content download sites allow receiving audio and video files. These files may or may not be protected by DRM. Users download the content files, which can take minutes or hours to complete. During the download process, the computer processor and Internet connection is taxed by this process. Often users begin a download and abandon their computer until the process completes. Some download processes display a status bar showing progress, a "please wait" message or an animated graphic.

BRIEF DESCRIPTION OF THE DRAWINGS

The present disclosure is described in conjunction with the appended figures.

Figure 1A:
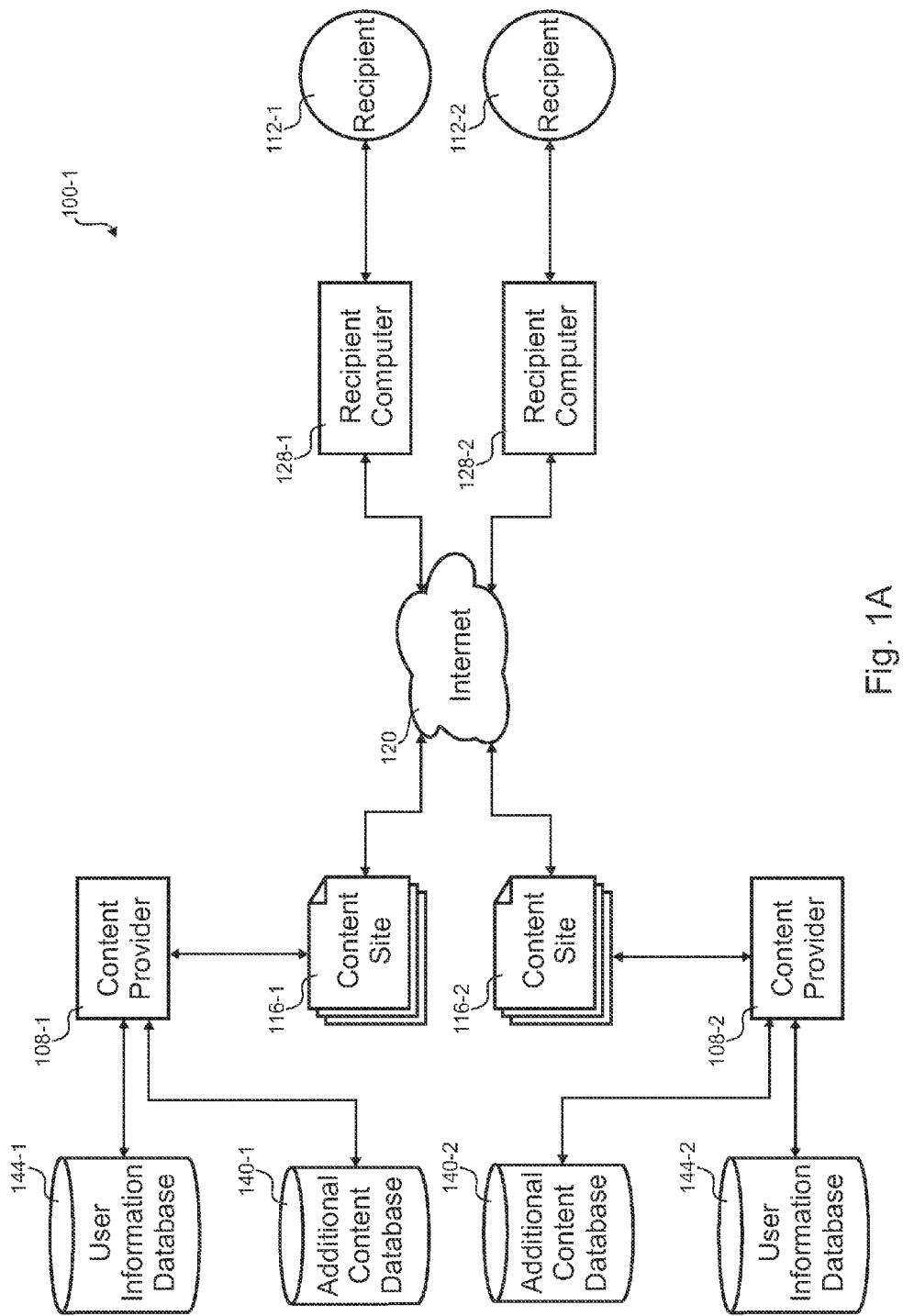
FIGS. 1A, 1B and 1C are block diagrams of embodiments of a content download system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order o the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In one embodiment, the present disclosure provides a content download system for downloading a content file and additional content using a window. The content download system includes a content site, a content provider and a third party. The content site presents the window that displays the download progress of the content file, presents the additional content while the content file is downloaded, and allows selection of the additional content. The content provider serves as an origin server for the content file. The third party receives information on the content file and provides the additional content.

In another embodiment, the present disclosure provides a method for downloading a content file and receiving additional content with a window. In one step, selection information is received that indicates the content file chosen by the recipient. The content file is downloaded with the window where status is displayed with that window. It is determined which additional content to present, where the additional content is associated with the content file and/or customer in some way. Access to the additional content is allowed from the window while the content file is downloading.

In yet another embodiment, the present disclosure provides a method for downloading a content file and receiving additional content with a window. In one step, selection information is received that indicates the content file. The content file is downloaded with the window, where download status information is provided with the window. The additional content to present is determined. The additional content is associated with the content file and/or customer in some way. In this embodiment, the additional content is video or audio. Access is allowed to the additional content while the content file is downloading.

The present invention enhances delivery of a content file, such as, a video, music/audio file, a picture, an e-book, a game, software, a manuscript or any other copyrightable material. In one embodiment, the download manager provides additional content during and/or after the content is downloaded. For example, the customer may download a song from a particular artist, before a ten second video vignette is played for the customer thanking the customer for legally acquiring rights to the song. The vignette could include a message from the artist, a music video, a cross-promotion, or some other additional content related to the download. In various embodiments, the additional content could include hypertext links to more information about the content file, lyrics or other written material, a karaoke version of the content file, applications or games related to the content file, audio and/or video messages, pictures related to the content file, an e-book, animated videos, FLASH™ demonstration, album art, liner notes, song lyrics, different encodings of the content file, CD label artwork, desktop wallpaper or computer themes, related content files (e.g., "making-of" videos, artist interviews, and out-takes), etc.

The additional content is tailored to the context of the situation. The genre of the content file, artist of the content file, label or studio promoting the content file, download service used for download, customer identity (e.g., name, age, address, phone number, etc.), prior purchases of the customer, recent events, fan club memberships, etc. can all be used in determining the additional content for a given situation. For example, the download manager and download service could determine that a particular video vignette had been played previously and arrange for a new one to be played. In another example, a customer with a significant interest in an artist, genre, studio, or label (as evidenced on their content collection or buying habits) could be invited to join a club of like-minded customers, join an online community and/or receive a fanzine or magazine subscription. In yet another example, when a particular song or video is downloaded, the artwork on the tangible version could be displayed. This could also include the liner notes, lyrics, credits, CD artwork, bonus material, etc. typically found in distribution media for audio and video.

In another example, the system could recognize that my area code is 602 and I purchased song(s) from a specific artist. It could then play a video vignette with that artist saying, 'Thanks for buy my latest song. I'll be in Phoenix on October 12 for a concert, please call 888.555.1111 for ticket information.'. This illustrates an unique aspect of the invention in that tailored and relevant additional content is made available to these online download services to be provided to receptive customers as promotion. Unlike a conventional record store experience, where a person simply checks out at the register and never hears about concerts in the area, the experience of this invention can enhance the fan's affinity to an artist in one embodiment.

The experience of rich content download could be consistent regardless of the number of download services used to collect the content. The download manager could be used with any number of download services. The download manager could determine or track the content files on the user's computer(s) or could query a database(s) that indicated the content files licensed to the customer. The licenses of the customer could be kept in a central database and/or databases maintained by the download services, licensing agencies, artists, studios, labels, and/or other organizations.

In some embodiments, the additional content could include additional content files or expanded rights to existing content files. For example, if the download manager and/or download service determines that eight of ten songs from an album had been purchased, the download manager and/or download service could offer the remaining two songs at a discount or for free. The rights to the content file controlled by the DRM could be expanded if certain conditions are met, such as rights to write a movie to a disk if five movies are purchased from a particular studio.

In some embodiments, this information could be embedded in the content file or sent separately. The additional content could be activated while during the content file download or after the download is complete. Configuration screens of the download service and/or the download manager allow disabling some or all of these features.

One embodiment allows a low-bandwidth version of the additional content that only provides links, text and/or pictures. By selecting a link, the customer can optionally download the additional content. The low-bandwidth version could be selectively enabled by the customer by configuring the download manager and/or content service. Other embodiments could have low-bandwidth additional content during the download and switch to higher-bandwidth additional content afterward.

With customized additional content, a wide variety of possible additional content could be collected. A distribution strategy would be designed into an algorithm for promoting the content file in a desired manner. For example, an artist might record tens of video or audio vignettes that would be played in various situations, such as a vignette promoting a new song that is played the week of the new song's release. New vignettes could be added over time to address current issues and/or new promotion strategies. The download service could provide interfaces to the artists and their representatives to allow customizing of the distribution strategies. In one example, the download manager displays a listing of other content files that are determined to be of interest to the customer. Some embodiments may store the interests of the customer in the download manager and/or could store the interests in a database remote to the customer's download manager.

In this embodiment, application software or applets are used to implement the download manager. This functionality could be embedded into the web browser and/or media player in other embodiments. The download manager displays a window or activates a window in another program to present the additional content. For example, the download manager could activate a video player application that plays a streamed video vignette chosen by the download service after download of the content file. The customer may automatically be presented with the additional content or be required to request it with a link or button.

In one embodiment the download manager includes an embedded browser next to the audio or video presentation portion. This adjacent browser could offer free downloads of other content files and links. Activation of a link for another content file in the adjacent browser window could launch another and separate download manager for those other content files. Alternatively, a single download manager could also download the other content files.

In some embodiments, the additional content is available before purchase or download of the content file. Other embodiments may only describe the additional content, but not make it available until after purchase or download. Yet other embodiments may be a hybrid between these approaches that makes some additional content available before download or purchase, while other additional content is made available afterward. For example, the information describing the content file may include a picture of the cover of the album, but the liner notes are not available until after download or purchase. The download manager and/or download services could remember the entitlement to the additional content so it would be accessible at a later time.

In another embodiment, a video or audio vignette is played, which could be a promotion or commercial. To assure the customer is present, a test question or button might have to be executed after completion of the vignette. Once the presence of the customer is confirmed, additional content is provided as a bonus. This interaction could follow an algorithm, storyline or theme in nested loops and branches in various directions much like an interactive game. In this way, interaction with the vignettes qualifies a customer for additional content, which may or may not be a content file.

The principals of this invention could be extended to customization of the download manager according to some theme. For example, skins, buttons, title bars, etc. could be customized for the download manager, artist, label, studio, genre, etc. This customization could be tied into the download service. As an example, the download service could have a religious music section. When the download manager is activated, the look and feel is customized for that genre. The download manager could call predefined configurations or could send a custom configuration. These configurations could be tied to advertising contracts. For example, when a particular artist has their content file downloaded, their sponsoring cola has their configuration customize the download manager.

Referring initially to FIG. 1A, a block diagram of an embodiment of a content download system 100-1 is shown. This embodiment shows two content providers 408 and two recipients 112 to keep the diagram simple, but there could be any number of content providers 408 and recipients 112. Each recipient 112 has a recipient computer 128 that is used to download and store content objects received from the content provider 408 over the Internet 120. These content objects could be files or streams, for example, a video, music/audio file, a picture, an e-book, a game, software, a manuscript or any other copyrightable material. DRM may be used on the recipient computer to manage the rights of the licensee/recipient 112.

One or more content providers 408 are available to the recipient 112 for downloading content objects. The content provider 408 aggregates content objects from a number of copyright holders and makes them available for order from a content web site 116. Examples of content providers 408 include video download services, music download sites, audio download sites, software download sites, eBook sales sites, software download sites, etc. The content provider 408 could be a single server or multiple servers that supply the content objects, for example, there could be caches or mirrors to assist in the distribution load.

The content provider 408 stores various information. Primarily, the content provider 408 stores or has access to the content objects made available on the content site 116. Some embodiments retrieve the content objects directly from the copyright holders or their agents after the content object is ordered such that local storage is not necessary.

The content provider 108 also stores information on the recipients 112 that use the content site 116. A user information database 144 stores demographic information, payment information, ordering history, and any preferences of the recipient 112. The user information database 114 is used along with information from the current order when determining the additional content to offer the recipient 112 during download. Some embodiments of the content provider 108 may have access to a license or content database on the recipient computer 128 or stored elsewhere that allows the content provider 108 to determine which content objects were ordered from other content providers or that the content provider 108 has no record of. By accessing a broader sampling of what types of content objects the recipient 112 is interested in, the additional content can be offered with a greater chance that it is relevant to the recipient. For example, the recipient 112 may be ordering a single song, but a check of the license database might find that nine of ten songs from an album had now been purchased from a variety of content providers. The additional content offered could be the last song from the album.

The content provider 108 has access to an additional content database 140. When a recipient 112 is downloading one or more content objects, additional content is offered to the recipient 112. The additional content that is offered is related to the recipient's preferences, location, past purchases, content licenses, the currently ordered content object(s), and/or other criteria. The additional content could include hypertext links to more information about the content file, lyrics or other written material, a karaoke version of the content file, applications or games related to the content file, audio and/or video messages, pictures related to the content file, an e-book, animated videos, FLASH™ demonstration, album art, liner notes, song lyrics, different encodings of the content file, CD label artwork, desktop wallpaper or computer themes, related content files (e.g., "making-of" videos, artist interviews, and out-takes), etc. A browser window or an application window displays the progress of the content object download and provides links to the additional content. In some embodiments, the additional content is automatically played in the download status window. The recipient 112 adjust preferences to specify if additional content should be offered and if additional content can automatically begin playing without requiring any interaction.

Figure 1B:
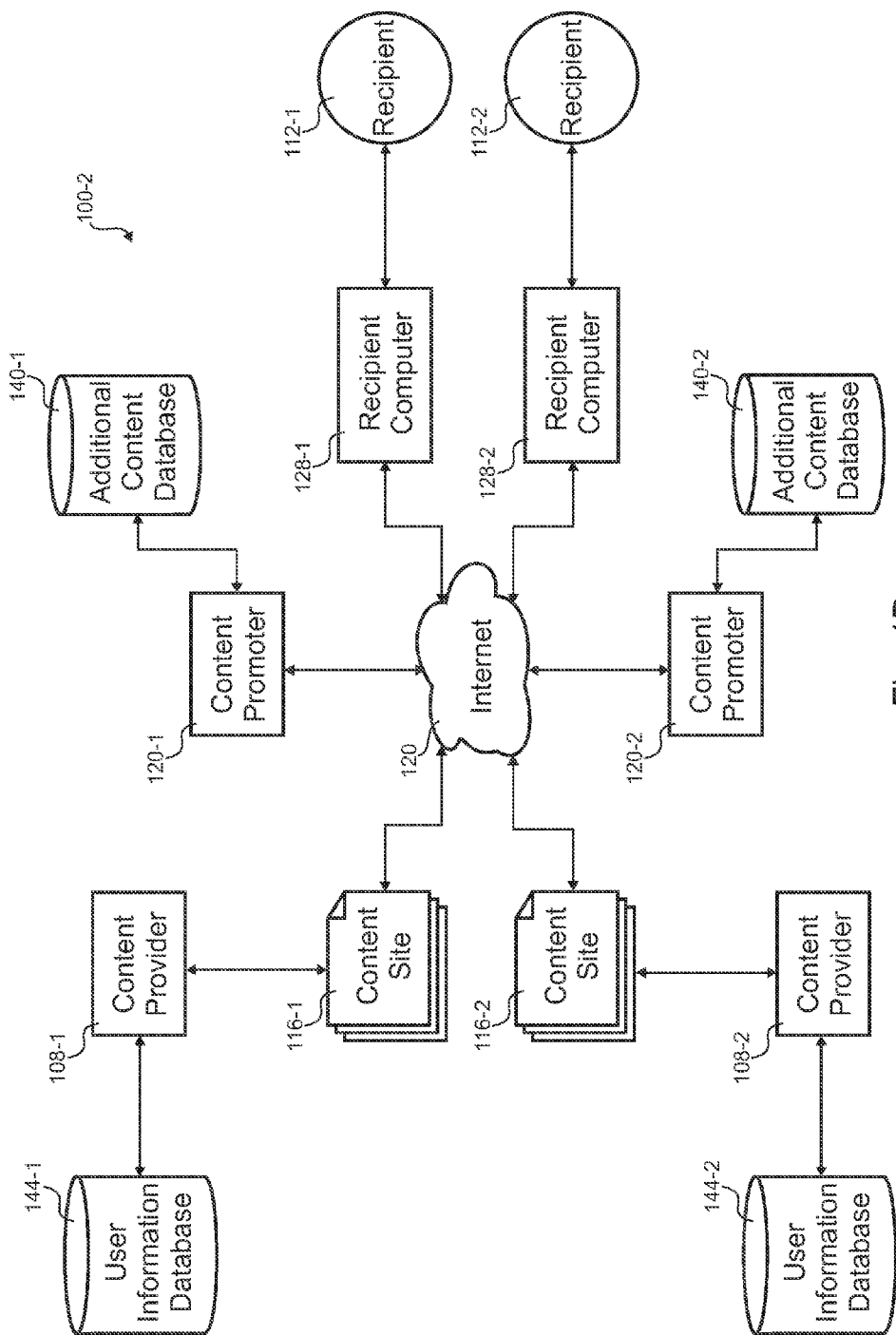

With reference to FIG. 1B, a block diagram of another embodiment of the content download system 100-2 is shown. In this embodiment, the additional content database 104 is managed by one or more content promoters 120. Two content promoters 120 are shown in the diagram to make things simple, but it is to be understood that any number of content promoters 120 could be present in various embodiments. The content promoter 120 is typically the copyright owner, an agent of the copyright owner, and/or an owner or licensee of the copyright owner.

When a content object(s) is selected for download, the identity of that content object is passed to the content promoter 120. The content provider 108 may also send information from the user information database. The content promoter 120 analyzes what is passed and chooses one or more pieces of additional content from the additional content database 140. That additional content can be passed to the content provider 108 for adding to the download status window or the content promoter 120 can present the additional content in a portion of the download status window by controlling a framed portion of that window.

Figure 1C:
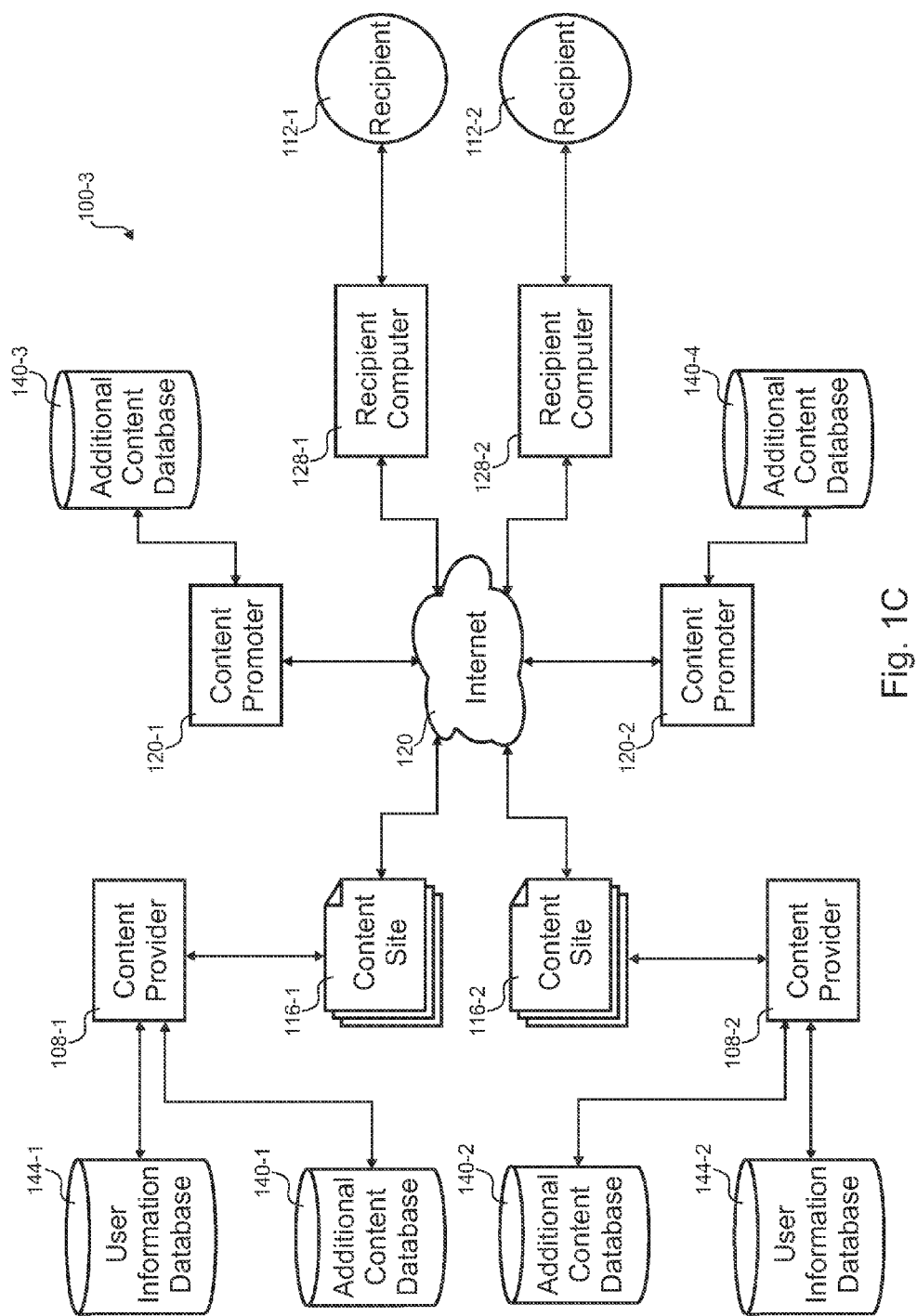

Referring next to FIG. 1C, a block diagram of yet another embodiment of the content download system 100-3 is shown. In this embodiment, both the content provider 108 and the content promoter 120 can provide additional content. For example, the content provider 108 may offer additional content related to the user information database 144 contents and the content promoter 120 may offer additional content related to the content object(s) ordered. Some embodiments may have the content provider 108 supply the additional content in some cases, but have the content promoter 120 supply it in other circumstances. For example, the content provider 108 could supply additional content when a content promoter 120 cannot be located or has no additional content to offer.

Figure 2A:
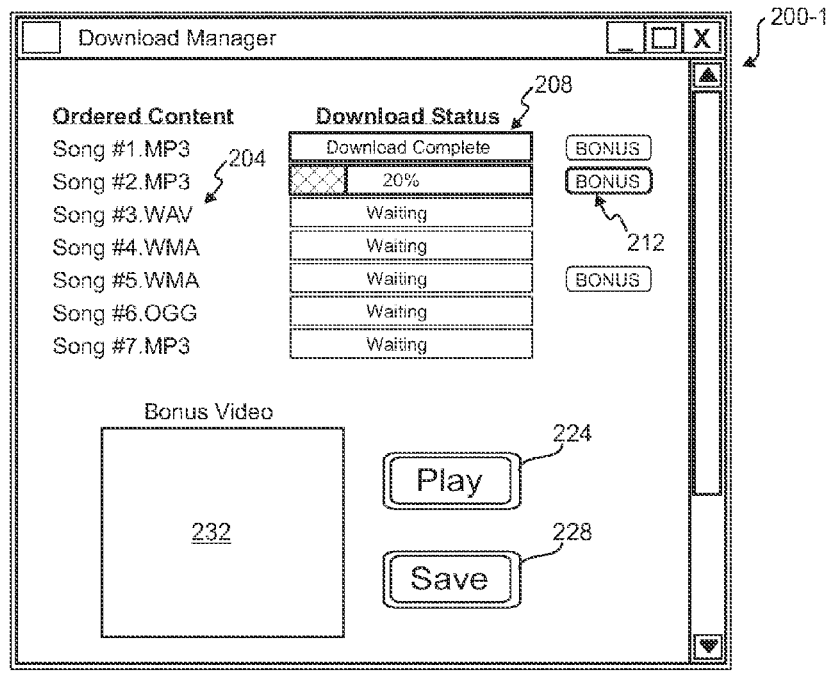
FIGS. 2A, 2B, 2C, 2D, 2E, 2F, 2G and 2H are screen shots of embodiments of a download status window.

Referring next to FIG. 2A, a screen shot of an embodiment of a download status window 200-1 is shown. The download status window could be produced by a web browser, application software or an operating system. In this embodiment, the download status window 200-1 is produced by a download manager program. When the recipient 112 selects all the content objects for download from the content site 116, a download manager program is customized to point to the content objects. The download manager program is received by the recipient computer 128 and executed. Once executed, the download status window 200-1 is presented. In another embodiment, the content site 116 presents a download status window 200-1. Yet another embodiment, integrates the functionality of the download status window into the browser or operating system such that a rich download experience is available for all or select downloads.

The download status window 200 shows the file name 204 of the ordered content objects. Download status 208 is provided for each of the ordered file names 204. The content provider 108 indicates with a bonus button 212 when additional content is available for a particular file name 204. In some cases, the additional content is associated with a number of files 204 or is a general bonus that is not specifically related to the listed file names 204. In the depicted embodiment, there are bonuses for three of the seven content objects selected for download. The second-listed bonus button is currently active and is associated with a bonus video 232. The recipient 112 can activate a play button 224 to begin the video 232 and/or can save 228 the bonus video 232. In some cases, the bonus video 232 cannot be saved and may be subject to DRM.

Figure 2B:
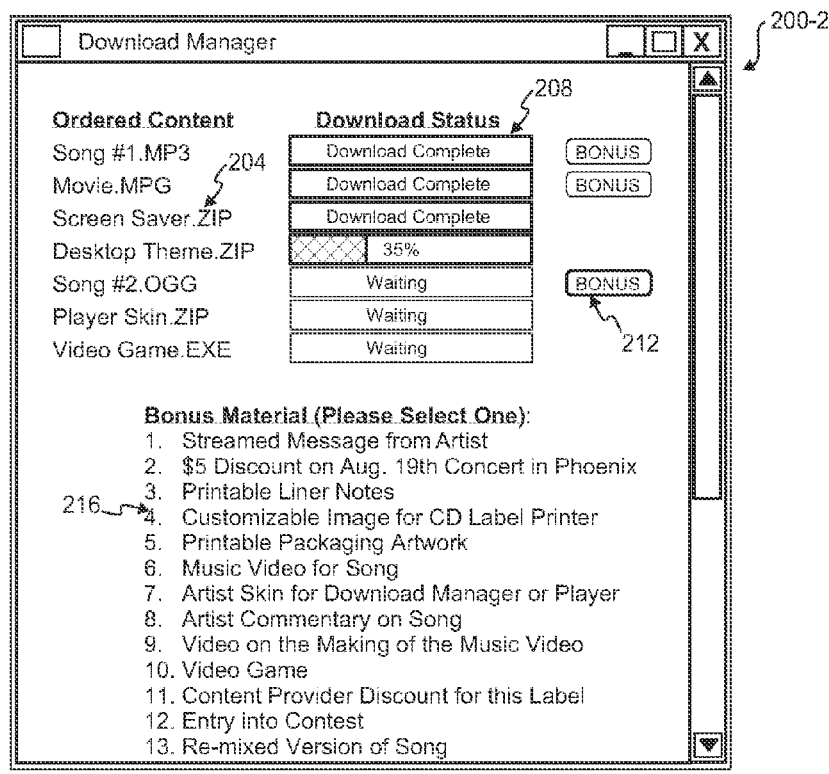

With reference to FIG. 2B, a screen shot of another embodiment of a download status window 200-2 is shown. In this embodiment, the selected bonus button 212 for the fifth content file activates a list of additional content that is available to the recipient 112. In this example, only one can be selected from a list 216 of bonus items. Each item in the list 216 links to the additional content offering or some additional information about the offering. The additional information could be displayed in the download status window 200 or in another window.

Some additional content would be downloaded and appear in the download status window 200 as another content file if selected. The first additional content option would provide a video or audio message from the artist for the fifth content file. The video or audio message could be customized according to the particular recipient. For example, the content promoter 120 may notice that the recipient 112 has downloaded a significant portion of a particular label's offerings. The artist's message may invite the recipient to join a club for that label, which would offer discounts and information about offerings.

Figure 2C:
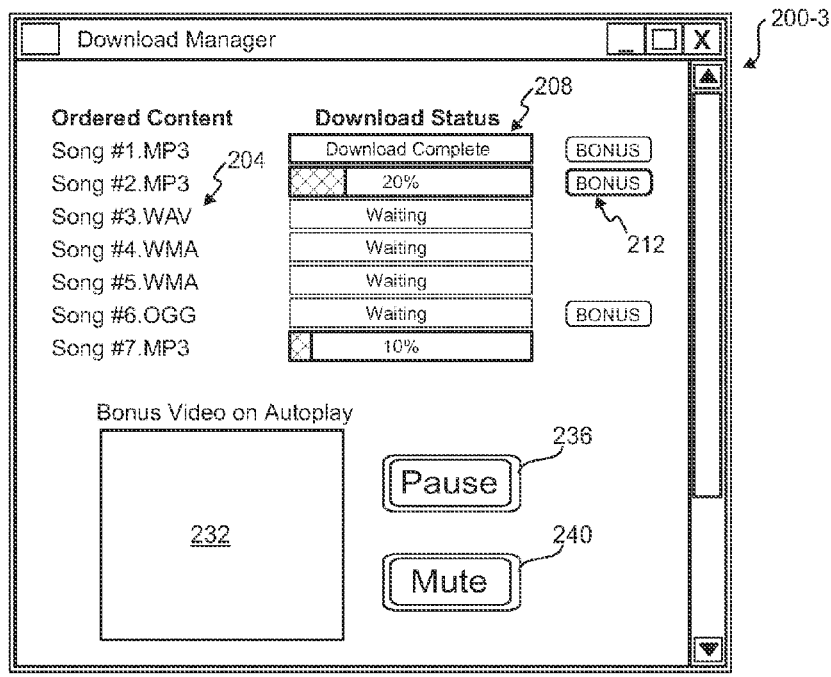

Referring next to FIG. 2C, a screen shot of yet another embodiment of a download status window 200-3 is shown. In this embodiment, the bonus video 232 begins playing automatically. The video begins during download of the associated content object. Some embodiments may play the bonus video at any point during the download of the content objects. Care is taken not to play the streamed content while associated content for another content object is presented. The recipient 112 can pause or mute the playback with soft buttons 236, 240.

Figure 2D:
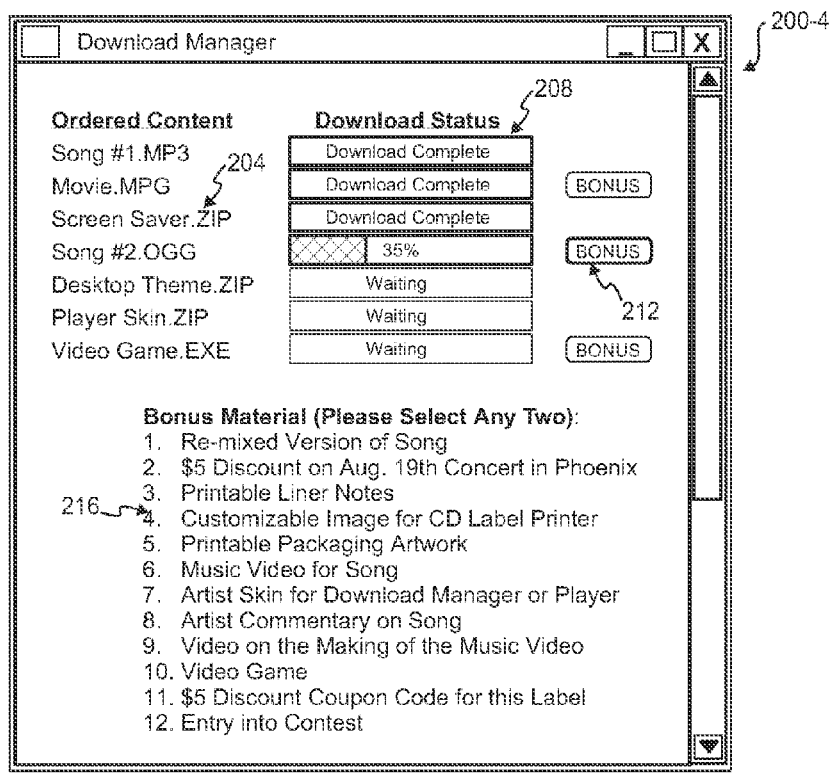

With reference to FIG. 2D, a screen shot of still another embodiment of a download status window 200-4 is shown. This embodiment allows selection of any two listed selections. The associated content for a particular content object gives a number of options from which two can be selected. Other embodiments could have any number of ways to select multiple bonus items. For example, there could be two lists and the recipient 112 could select a number from each list. In another example, the first selection of the recipient 112 affects a second list presented that has additional items.

Figure 2E:
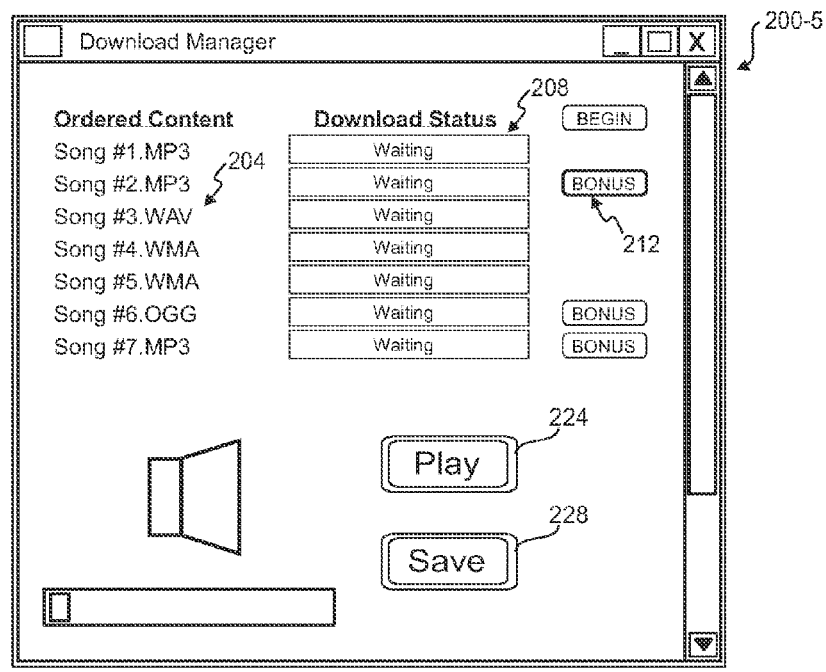

Referring next to FIG. 2E, a screen shot of one embodiment of a download status window 200-5 is shown. In this embodiment, a sound clip is presented as a bonus for the second content object. The recipient 112 can play and/or save the associated content. In this example, the associated content is available before download has begun for any of the content objects.

Figure 2F:
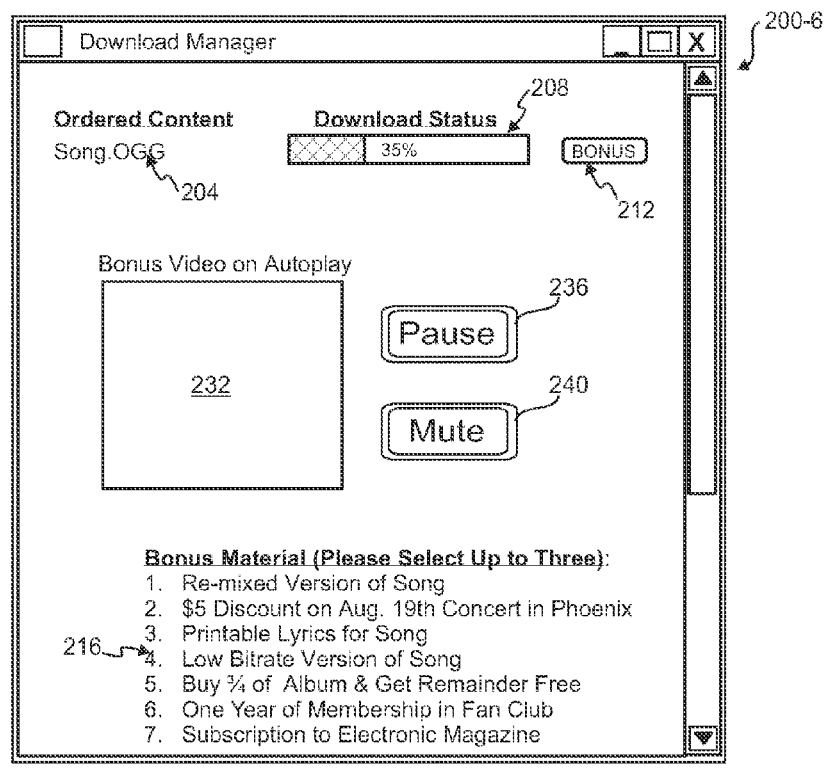

With reference to FIG. 2F, a screen shot of another embodiment of a download status window 200-6 is shown. In this embodiment, a single content object is selected for download. The content object has an automatically streamed video as associated content and also has a list of bonus items 216. Three of the bonus items 216 can be selected. Even though this embodiment shows a bonus button 212, it could be eliminated in an example where there is only one bonus available.

Figure 2G:
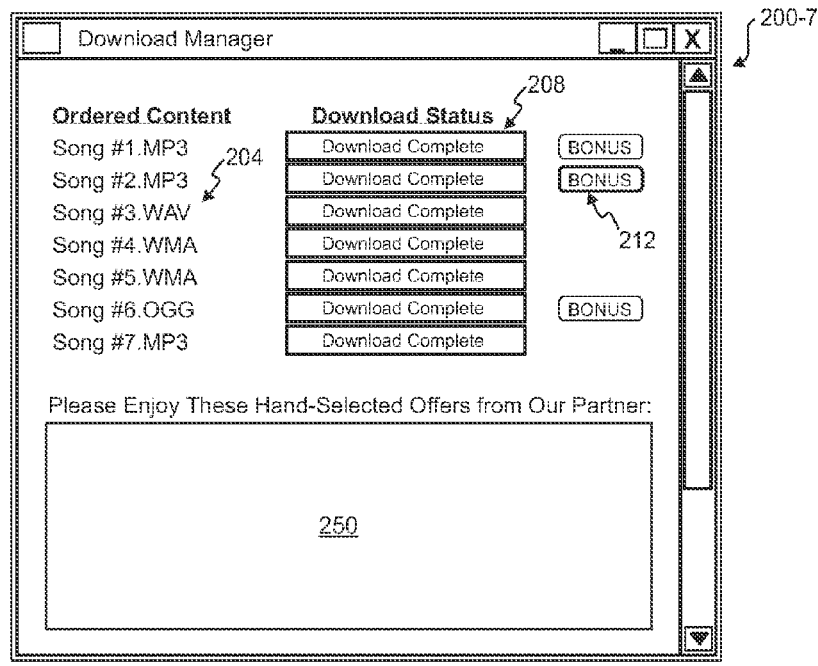

Referring next to FIG. 2G, a screen shot of yet another embodiment of a download status window 200-7 is shown. In this embodiment, a frame 250 is provided for the bonus on a particular content file 204. The frame 252 is populated with information from the content promoter 120 or some other third party. Other content files 204 on the list could have additional content provided from the content provider 108.

Figure 2H:
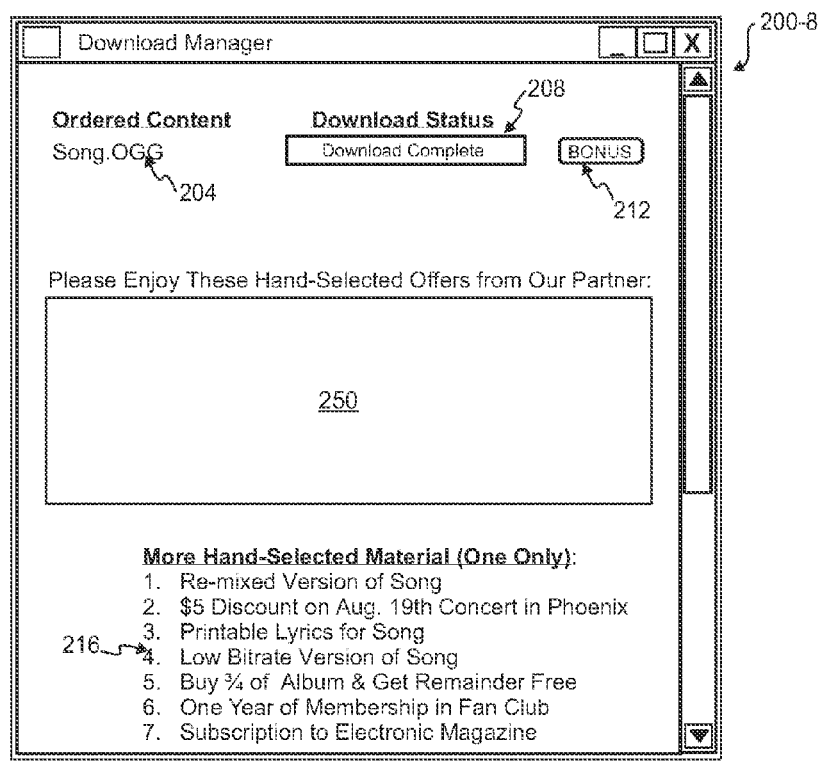

With reference to FIG. 2H, a screen shot of still another embodiment of a download status window 200-8 is shown. In this embodiment, part of the additional content is in a frame 250 populated by a third party, but there is also a list of bonus items 216. The list of bonus items 216 could come from the content provider 108 and/or the content promoter 120.

Figure 3A:
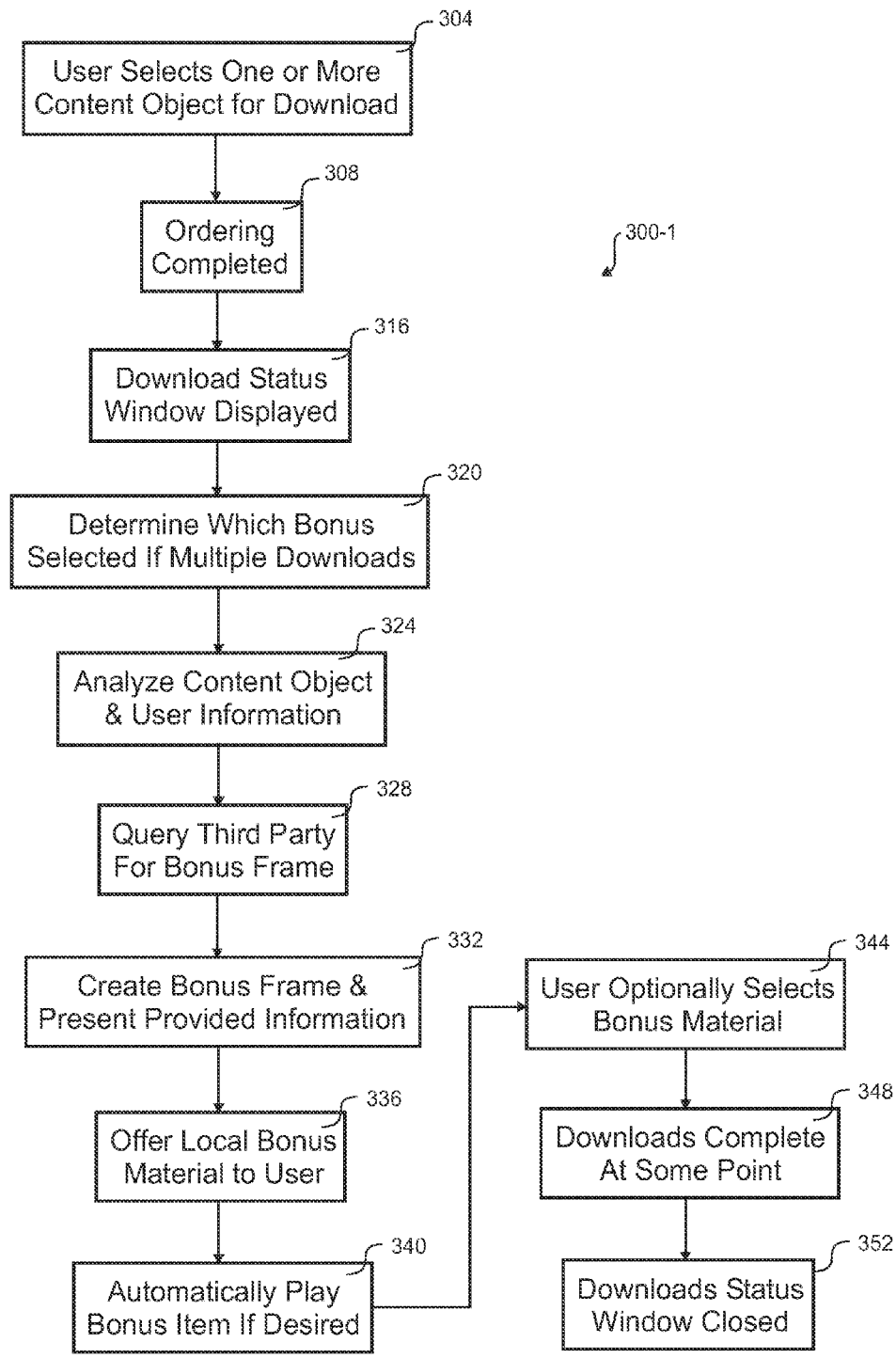
FIGS. 3A, 3B, 3C, and 3D are flow diagrams of embodiments of a process for downloading content in a rich environment.

Referring next to FIG. 3A, a flow diagram of an embodiment of a process 300-1 for downloading content in a rich environment is shown. The depicted portion of the process 300-1 begins in step 304 where the user interacts with the content site 116 to select one or more content objects for download or streaming. The ordering process is completed in step 308, which may involve payment for the content objects. In step 316, the browser or a download manager program display the download status window 200.

It is determined which of multiple bonuses should be currently displayed in step 320. The recipient could select a bonus button 212, the bonus of the currently downloading content object could be selected, or the bonuses could be offered in a sequential or random rotation during the download process. The bonuses could be available before or after download begins in various embodiments. Some embodiments allow access of the additional content after downloading completes, while others do not. In one embodiment, the additional content is available until the download status window 200 is closed.

Once the content provider knows which content object's bonus should be displayed, the content object and user information database 144 are analyzed. This analysis is split between the content provider 108 and the content promoter 120 in this embodiment. In step 328, the content promoter 120 or other third party is given the content object and user information and queried for a bonus frame to fill. The bonus frame 250 is displayed in the download status window 200 and populated with information from the content promoter 120 in step 332.

The content provider 108 uses the content object and user information database 144 to determine if anything in the local additional content database 140 should be offered in addition to the framed additional content. In step 336, the additional bonus material is also presented to the recipient 112. The content provider 108 and/or content promoter 120 who include a streaming video or audio message can automatically play it or not in step 340.

The recipient 112 can interact with the download status window 200 to select bonus material in step 344, but there is no requirement that the recipient 112 do so. In step 348, the download of the content objects and any selected additional content completes 348. The download status window can automatically close in step 352 or require manual closure by the recipient 112.

Figure 3B:
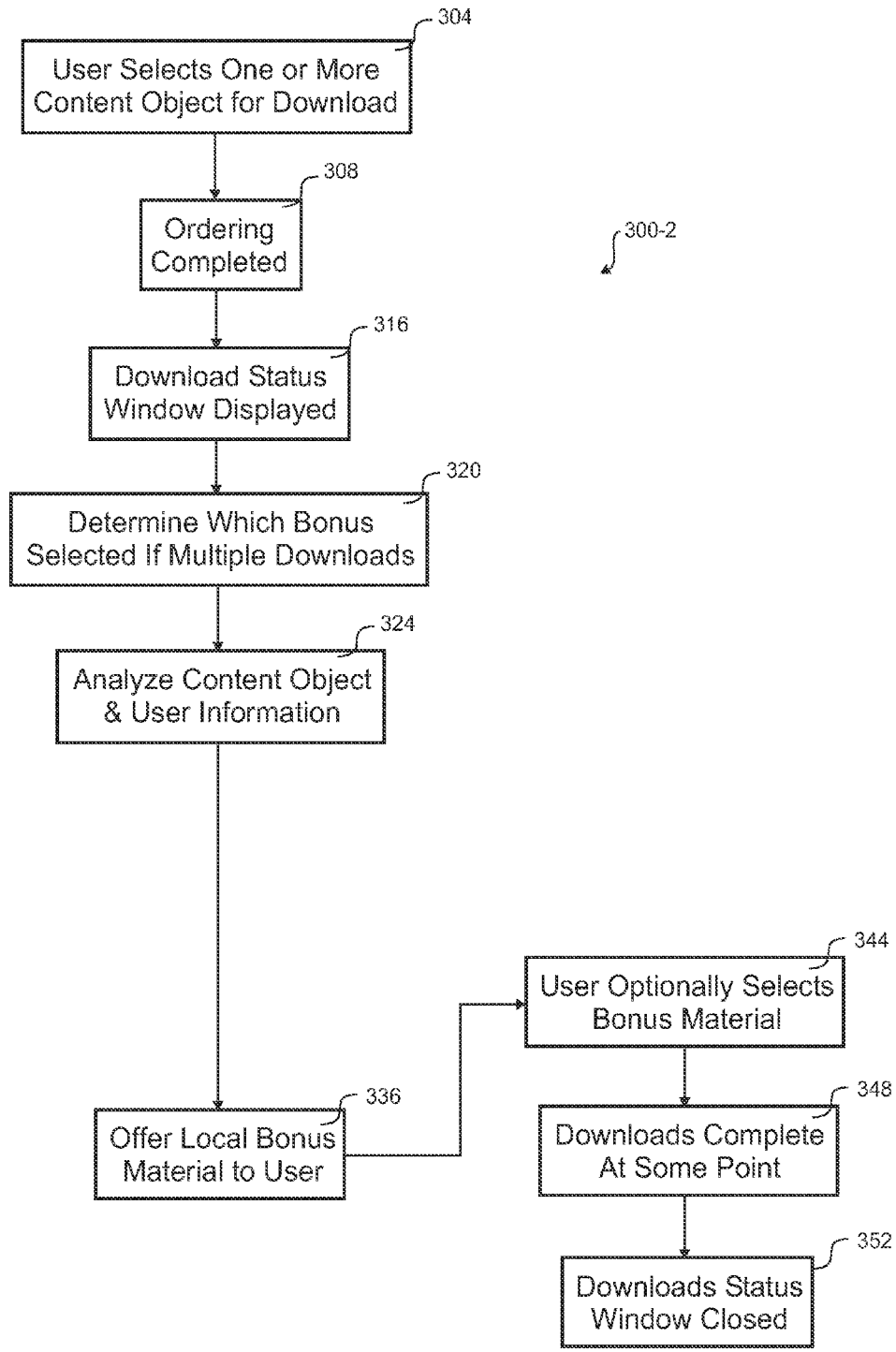

With reference to FIG. 3B, a flow diagram of another embodiment of a process 300-2 for downloading content in a rich environment is shown. This embodiment gathers all additional content locally and does not rely upon a content promoter 120 or other third party. Also, this embodiment does not automatically play additional content. This embodiment differs from that of FIG. 3A in that processing goes from step 324 to 336 without including steps 328 or 332. Additionally, step 340 is also skipped.

Figure 3C:
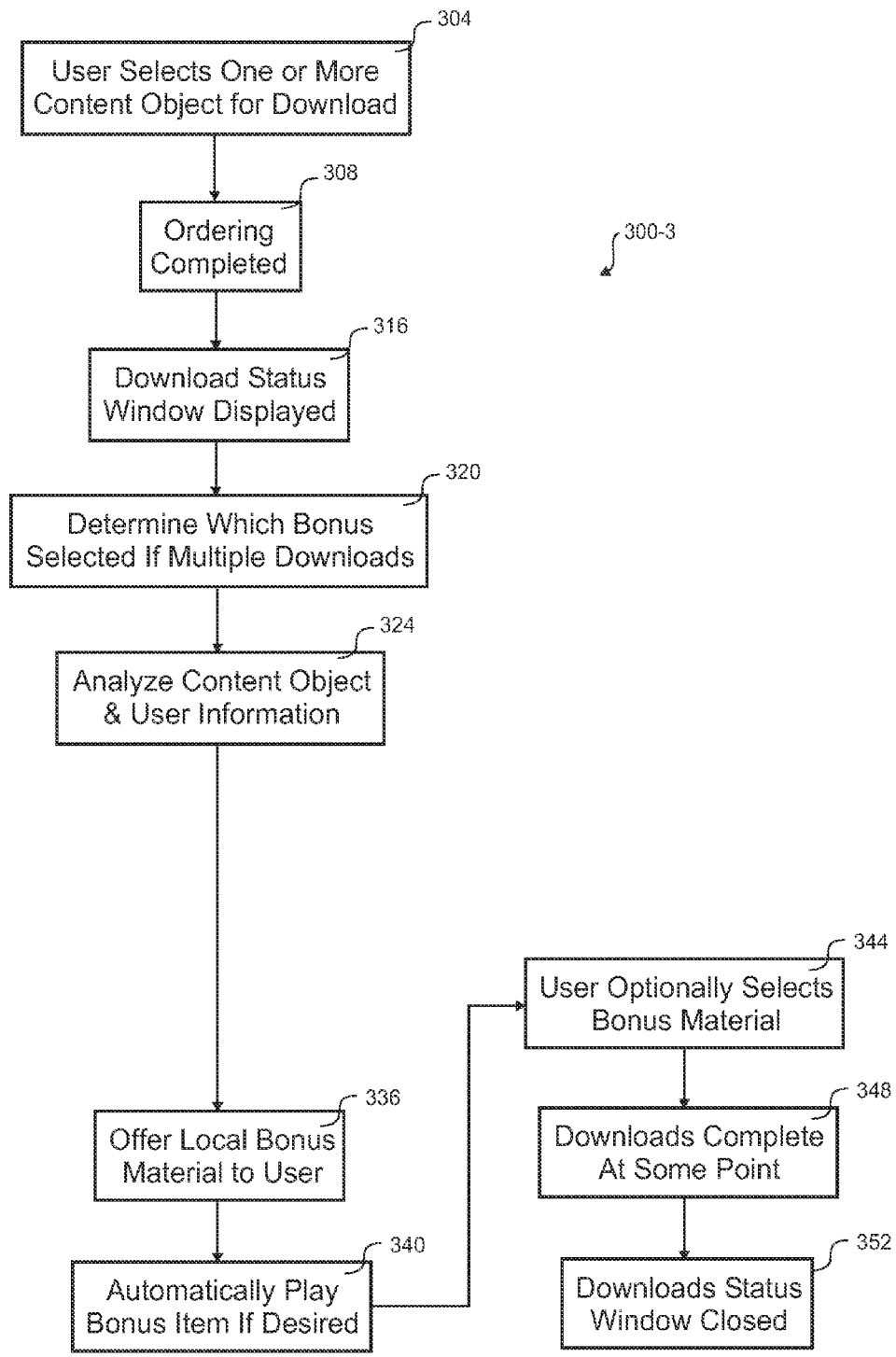

Referring next to FIG. 3C, a flow diagram of yet embodiment of a process 300-3 for downloading content in a rich environment is shown. This embodiment allows automatic playing of a bonus item if that is desired. The recipient 112 many disable this feature. This embodiment differs from that of FIG. 3A in that processing goes from step 324 to 336 without including steps 328 or 332.

Figure 3D:
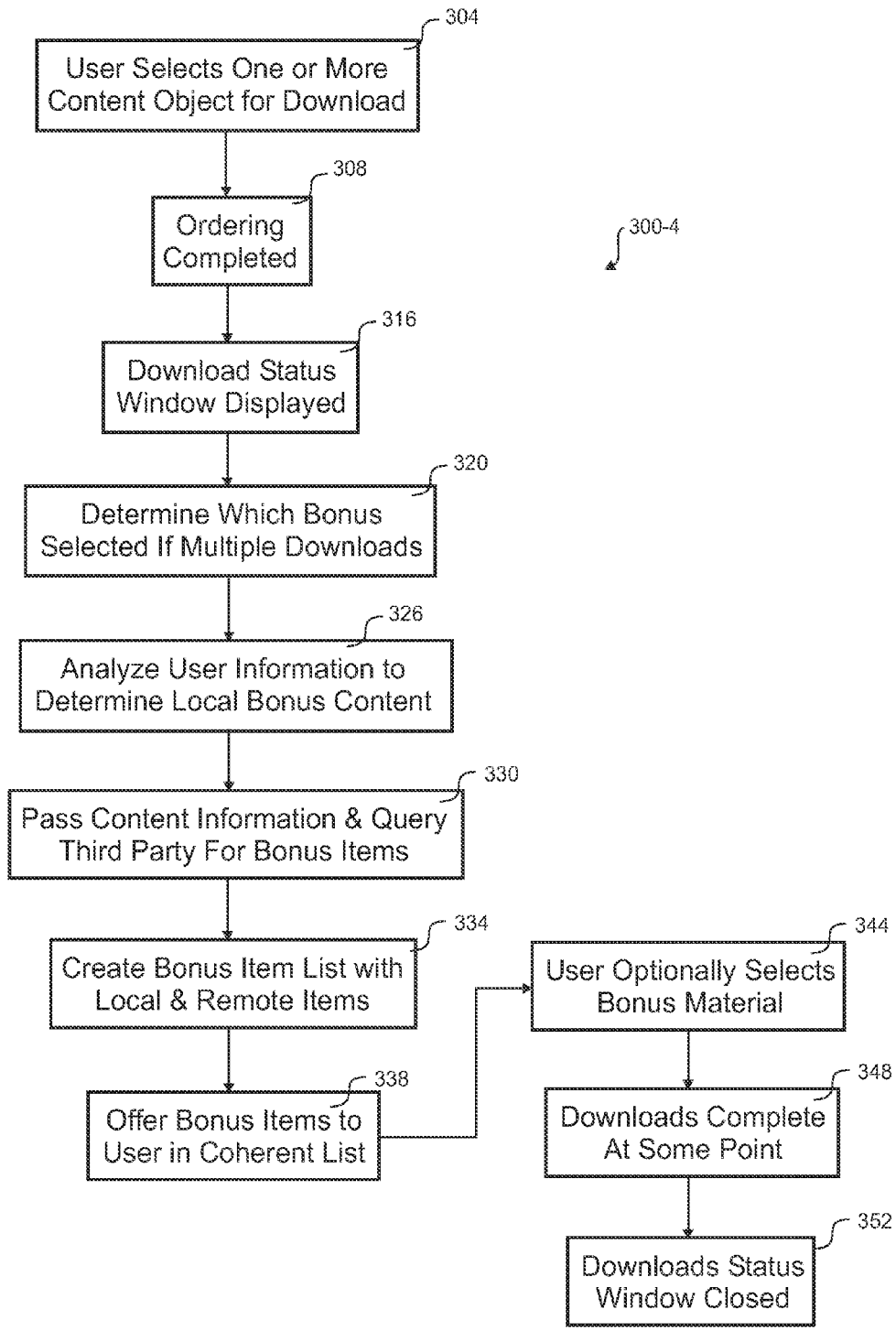

With reference to FIG. 3D, a flow diagram of still another embodiment of a process 300-4 for downloading content in a rich environment is shown. In this embodiment, processing is as in the embodiment of FIG. 3B until step 320 is completed. From step 320, new step 326 analyzes the local additional content database for bonus material. The content promoter 120 does not receive a frame, but is queried for items in step 330. A list with both locally supplied additional content and additional content from a third party is created in step 334 and offered to the recipient 112 in step 338. Processing continues from step 338 to step 344 without having a step 340 as in FIG. 3B.

As described above, some embodiments relate to different downloading instances. For example, a first content object may be initially downloaded and second content object may be later downloaded (e.g., following a user's request for the second content object). The content objects may be downloaded using different content-manager instances, and each instance may be customized with a different personality.

Figure 4A:
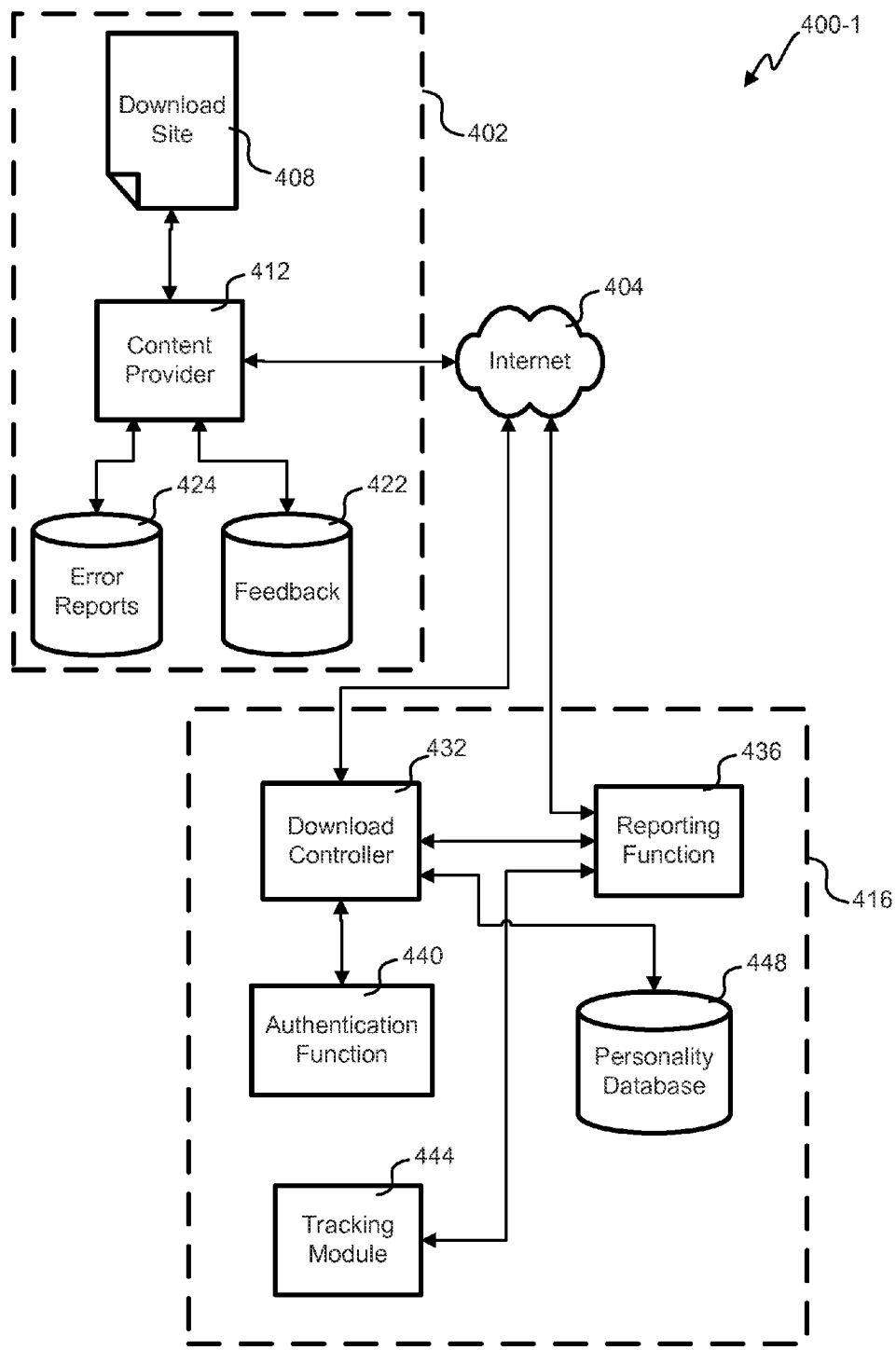
FIGS. 4A, 4B and 4C each depict a block diagram of an embodiment of a download system.

Referring to FIG. 4A, an embodiment of a download system 400-1 is shown. Included in the download system 400 are one or more content distributors 402 and one or more download managers 416. The figure only includes a single content distributor 402 and a single download manager 416, but it is to be understood that there are many of each in a typical download system 400. Instances of the download manager 416 are installed on user computers to facilitate download of content from various content providers 412. One instance of the download manager 416 can operate with any number of content providers. The content distributor 402 includes a download site 408, a content provider 412, an error reports database 424, and a feedback database 422.

The download manager 416 is amorphous in that it is customized with various personalities to conform with various content providers 412 and download sites 408, as well as various use cases used or supported by a content provider 412, download site 408, or group of content providers 422 or download sites 408. Various instances of the download manager 416 may be used cross-platform for any number of VoIP phones, personal digital assistants, media playing software or hardware, portable computers, desktop computers, set top boxes, game consoles, personal video recorders, optical disc players, IPTV players, or other content realizing devices. Various platforms would have natively coded download managers 416 as needed by their respective operating systems, but could have common use cases in some instances.

There are many use cases that might be applicable to different situations in which a download manager 416 might be used. Various content providers 412 have different use cases particular to their particular application. Each download site 408 can have a unique use case, for example, that guides development of a personality that is applied to the download manager 416 to suit the use case. For example, use cases are different for streaming live events, streaming pre-recorded content, file download, etc. and can be handled very differently by the download manager 416. Alternatively, a use case could be shared by multiple download sites 408 and content providers 412, for example, where multiple distributors provide the same digital product, or digital products from among the same family of digital products or brand of digital products.

Each instance of the download manager is uniquely identified to the content provider. An instance of the download manager is defined herein as a download manager application customized with a personality, for example, a download manager may have five personalities such that there are potentially five instances that may or may not be active concurrently. After downloading an instance of the download manager, the user enters some type of identifying information for authentication. For example, the user might enter a user name and password. After entry of the identifying information, the content provider can attribute the instance of the download manager to a particular account while uniquely identifying the instance.

The use cases are used to design a personality that can be applied to customize the download manager 416 temporarily for a particular content download. The use case can specify quality of service, where any error reports or feedback should be sent, authentication requirements, how the graphical user interface can be customized, information to track, location for downloads, security and privacy settings, how user customizations is inherited, etc. The use case may also specify the protocols and encryption used for the download, for example, secure sockets layer (SSL) or hyper text transfer protocol (HTTP). Some embodiments allow the download manager 416 to service a number of downloads from a number of different download sites simultaneously. In one example, a user may indicate that a video streaming personality should maintain a particular bandwidth and that override for that personality could be inherited by all video streaming personalities that allow customizations to be inherited.

A personality can be loaded into the personality database 448 at run-time or after the application is running to provide for a particular use case. These personalities are parameterized or soft coded to allow customization of the download manager 416 after the application is compiled. Other embodiments could use a table, configuration file or other mechanism to hold the personalities. In this embodiment, the personality is invoked or keyed off interaction with a particular download site 408 or the digital products that have been received from a particular download site 408. The download site may be represented by one or more IP addresses, one or more Internet domains, or one or more URLs; however, the download manager need not be connected to the download site 408 or the Internet to employ a particular personality. For example, an off-line user could review her download history related to a particular download site 408 or its products, and when she did so, the download manager would utilize the particular personality to control the user interface graphics and the data available to her.

Some embodiments could include one or more content delivery networks (CDN) that are used to deliver the content instead of the content provider. Error reports and feedback could also be gathered by the CDN and provided back to the content publisher. In other embodiments, the CDN could host one or more content publishers in one or more points of presence on the Internet.

A tracking module 444 provides the ability to gather error reports and other feedback. The personality loaded at the time will specify what information to gather or ignore. A reporting function 436 knows where to upload error reports and feedback. The active personality stores the remote location addresses or domains of an error report database 424 and/or a feedback database 422. In this embodiment, only an active personality can gather information and have it reported remotely.

Other personalities cannot get information gathered by any other personality unless there is a grouping of personalities as described below in relation to FIGS. 3A and 3B or unless they are otherwise permitted by that personality to do so. In other words, the personality providing the information can have rules on which other personalities or classes of personalities it will share information with. The rules might specify that some information is to be shared while other information is not shared. For example, the QoS requirements of the download maybe shared, but not demographic information that would identify the person that initiated the download is not shared.

Additionally, the personality is unique to a content publisher 402 in this embodiment. Other embodiments could have a few global personalities that can each be used by a number of instances of the download manager. For example, there could be a video download personality used by a Flash™ video player applet and an IPTV video player. Customizations to the personality would affect all download managers using the personality. Tracking and reporting would be defined by the personality, but could report to different locations or a central location in various embodiments.

A download controller 432 within the download manager 416 manages the download process, reporting, any authentication, loading personalities, etc. The download controller 432 can simultaneously download multiple files while operating under multiple personalities. Each personality is associated with one or more URIs or one or more IP addresses. When a file or stream is requested, the download controller finds the relevant personality; opens a window for that download; invokes any player, application or applet associated with the file or stream; and downloads the file. The personality can provide a skin for the window, custom graphics and content to appear in the window. From the perspective of the user, it appears like each instance of the download manager is a separate application.

A particular content publisher 402 may have more than one personality for a given domain or IP address. Different file and stream types could invoke different personalities. Parameters embedded in the URI could also select a different personality. The name of the file or stream could invoke different personalities. Protocol handshaking or metadata could signal use of a different personality.

For errors, the content provider 412 might have a web service to gather error or bug reports from all the download managers 416 into an error report database 424. If dictated by the use case, errors or bug reports are gathered from all the instances of the download manager 416 according to the personality. The web service for gathering the error reports is located at a particular web address or universal resource locator (URL) that is programmable in the personalities for a particular use case. The error reports can include download failures or stoppages, memory stacks, digital rights management (DRM) tampering, download status, bandwidth profiles, processor loading, operating system errors, application errors, QoS compliance, etc.

Some embodiments of the download manger also provide a mechanism to provide feedback or data to web service located at a programmable web address or URL. In this way, the download manager 416 can also upload information to the content provider 412. The contents of the feedback is customizable by the particular use case. Examples of feedback that could be chosen in the personality include download history, download queue, download time, bandwidth of downloads, micro credits consumed, cost of content, etc.

The download manager 416 also includes an authentication function 440 in this embodiment. Users of the download manager 416 may have a user identifier (ID) and/or password depending on whether the personality specifies any authentication and/or authorization checks. Where authentication is specified, the user enters a user ID once, periodically or every time the download manager 416 is invoked with that personality. Each user could have separate user IDs for each personality. The user IDs are unique within the realm of use case run on any number of computers, but could be overlapping when considering all users and use cases together. For example, one personality of the download manager 416 could have the user ID "WilliamBoy2", which would be unique to all download managers using that personality. Another personality could have the same WilliamBoy2 user ID to correspond to the same or a different user.

Although this embodiment uses a login for authentication, other embodiments could use other forms of authentication. Embodiments could use biometric authentication, token authentication, and/or implicit forms of authentication. In one case, the serial number or other identifier of the computing device is used for authentication without any knowledge of the user, for example. The serial number or other unique identifier can be used by the personality to report errors and provide feedback that can be attributed to that personality. Any parameter customization to the personality can be retained and associated with the serial number or unique identifier for future use when the personality is invoked in the future.

In other embodiments, the authentication could be for a number of personalities if they share user ID and password or otherwise have a trust relationship. Personalities in a trust relationship would allow authentication of one be authentication for all. In one case, the authentication for the computer, operating system or an application, other than a download manager, could be used in a trust relationship that one or more personalities could rely upon. For example, the operating system login could be used as authentication for one or more personalities.

The user ID could be usable on a number of different platforms supported by the use case. For example, a movie download service may be usable on a computer, a portable video player, a Blu-Ray™ player, a set top box, etc. and use a common user ID and password for authentication. A user could login at any supported computing device with the user ID to allow the content provider cross platform tracking of the users.

Some embodiments of the download manager 416 allow concurrent servicing of downloads from multiple sources using one or multiple personalities. For example, the download manager could be downloading content from three different sites, while enforcing the use case for each respective site. In another example, the download manager 416 could be downloading six files under the same personality.

The bandwidth available and QoS of the use case could be divided among the various ongoing downloads. For example, the computer may have 300 Kbps of available bandwidth and divide that equally between five instances of the download manager. The download manager 416 could avoid or share use of the bandwidth to provide for other applications of the user computer. With the available bandwidth, some downloads could be given priority. For example, a streaming download of a live event could receive priority over a file download with little QoS requirements. The download manager 416 could go through a process of meeting minimum QoS requirements first to avoid stuttering or pixelization of streamed content and divide the remaining portion of the bandwidth among the other downloads. A portion of the bandwidth could be reserved from use by the download manager 416 to provide for other applications, for example, the download manager could be limited to 80% of the bandwidth in one embodiment.

Each personality can modify the various parameters available for customization by the personalities. Where there is no modification, default parameters would be used. Additionally, the user can modify the default or personality parameters in some embodiments. For example, the bandwidth consumed could be up to 50% of the available bandwidth as a default. A particular personality may allow up to 90% of the available bandwidth to be used, which would override the 50% default if so desired by the user. The user could later decide that both should be overridden by specifying a 10% consumption of the available bandwidth. Some settings may be made available for modification by the user, while the personality may prevent others from being modified.

Where there is identification of the user through authentication or otherwise, the customization of the parameters could be stored for future use by the personality or even shared with other personalities if so allowed. Embodiments that allow feedback to a central location could store the customization for use by other personalities on other platforms such that the user may not have to enter the override parameters multiple times.

Figure 4B:
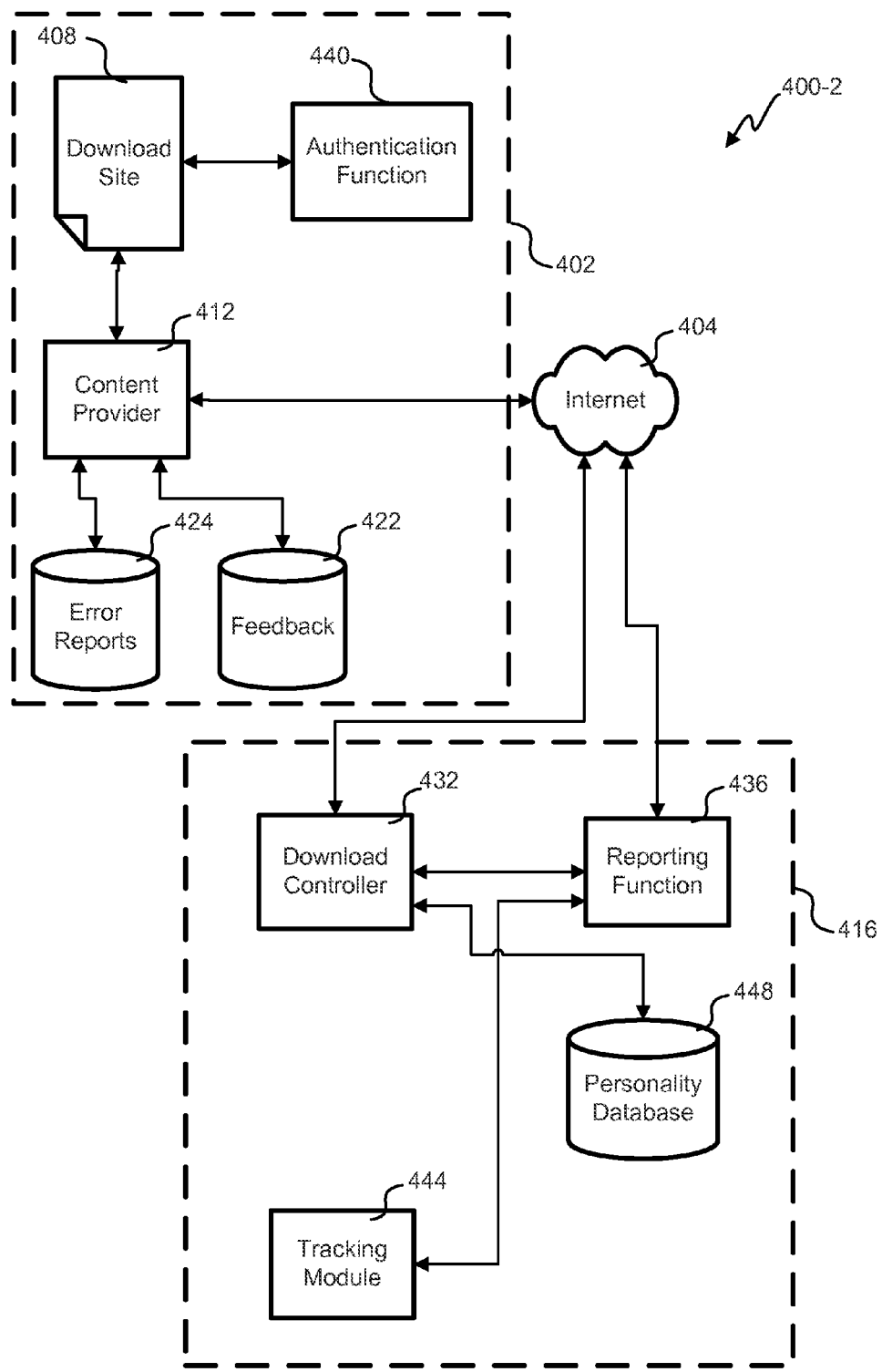

With reference to FIG. 4B, another embodiment of a download system 400-2 is shown. This embodiment performs authentication of the user of the download manager 416, but differently from the embodiment of FIG. 4A, which performed authentication with the download controller 432. The personality specifies a content publisher 402 and specifies that the content publisher 402 performs authentication remotely. In this embodiment, the authentication function 440 is at the URI or IP address of the content publisher 402, but other embodiments could have the authentication function 440 anywhere. Unless authenticity of the user, computer or software is given by the authentication function, the download manager 416 will not operate the instance with full rights. For example, if authentication is not confirmed, a file might be downloaded, but not played or may remain encrypted until authentication is confirmed.

Figure 4C:
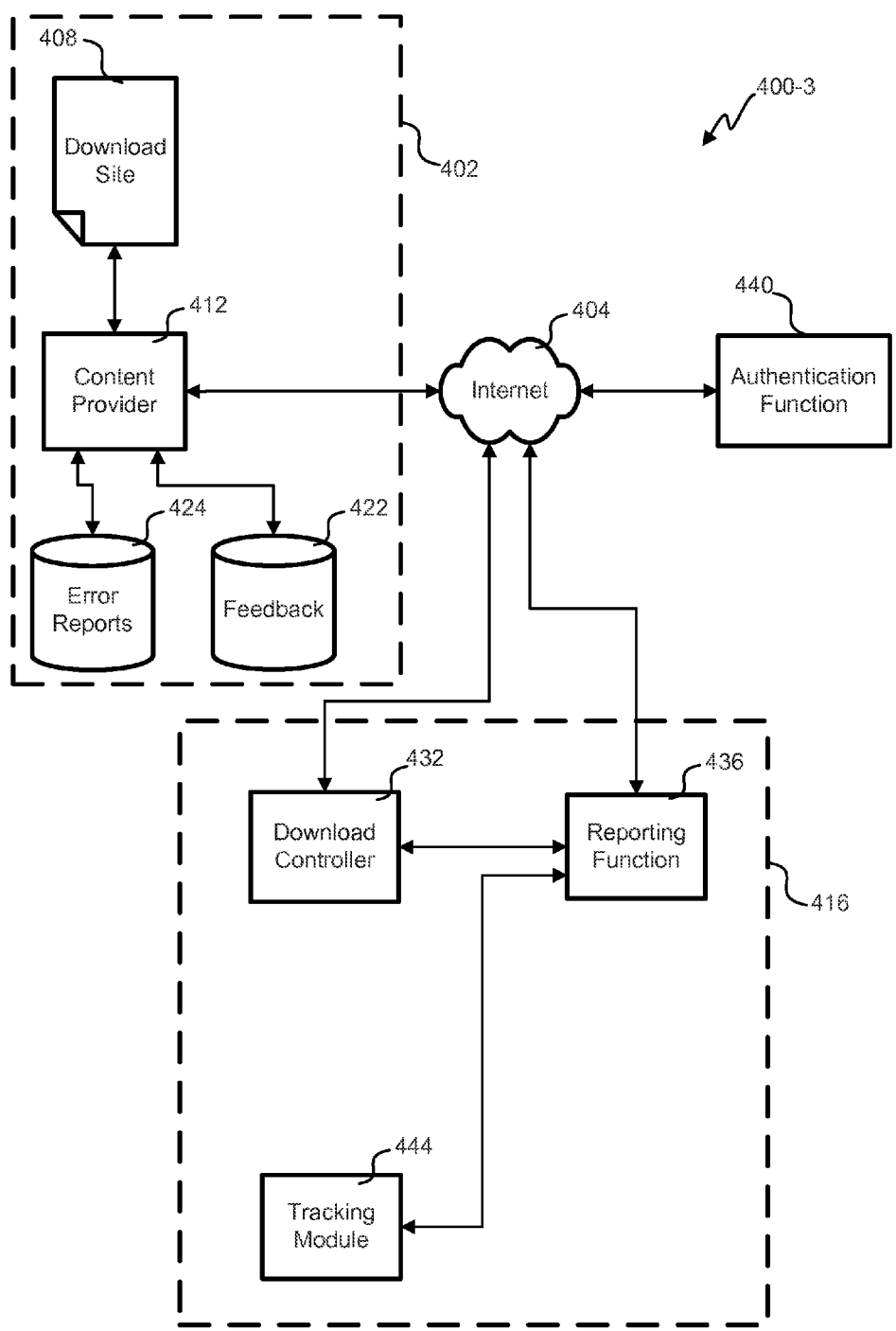

Referring next to FIG. 4C, yet another embodiment of a download system 400-3 is shown. This embodiment has the authentication function 440 located away from the download manager 416 and the content publisher 402. The authentication function 440 can operate for one or more personalities, even if those personalities don't share authentication information such as user ID. This embodiment does not include a personality database 448. The personality is sent from each content publisher 402 for each download. The personality may or may not be stored or cached for future downloads from the content publisher 402. The personality can be sent as a separate file, embedded in the protocol and/or metadata within the file or stream itself in various embodiments. Where there is no personality sent, a default personality can be used by the download controller 432.

Figure 5A:
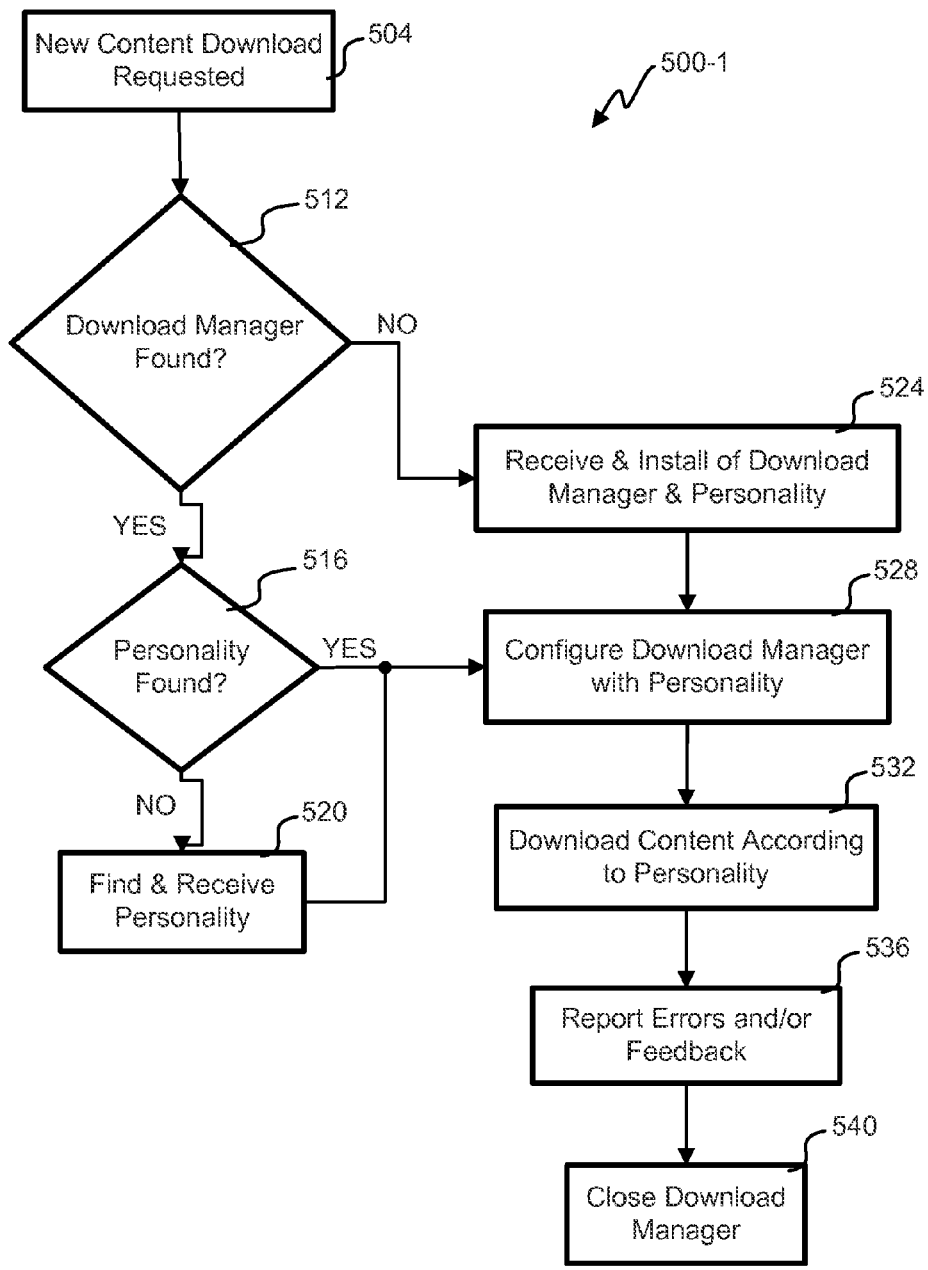
FIGS. 5A and 5B each illustrate a flowchart of an embodiment of a process for using a download manager.

With reference to FIG. 5A, an embodiment of a process 500-1 for using the download manager 416 is shown. This process 500-1 goes through a typical situation to get the download manager 416 installed on a computer with one personality and available to other content publishers 402 to load additional personalities. The depicted portion of the process 500 begins in block 504 where a user has selected a content file for download from a first site 408 or a first content provider 412. Most browsers confirm download and install of an application, plug-in or applet. The user could confirm the desire to download the content file. Where no download manager 416 is present as determined in block 512, one is downloaded with the relevant personality in block 524 for the content requested before proceeding to block 528.

If there is already a download manager as determined in step 512, processing would go to block 516 where a determination is made on whether the relevant personality for the use case dictated by the requested content. The personality is located and loaded in block 520 if not found in block 516. Subsequent encounters with the content publisher and/or content file type will load the personality from where it is stored in the personality database 448. Some embodiments may ask for acceptance before loading the personality or perform the load automatically.

In any event, going into block 528 from any of block 516, 520 or 524 will configure an instance of the download manager 416 with the personality. The content is downloaded according to the use case defined by the personality in block 532. As dictated by the personality, error reports and feedback can be provided in block 536. After download of the requested content, the instance of the download manager 416 is closed in block 540. Some embodiments could invoke an application that might play the content during download for streaming content or could play a content file with an application after download.

Figure 5B:
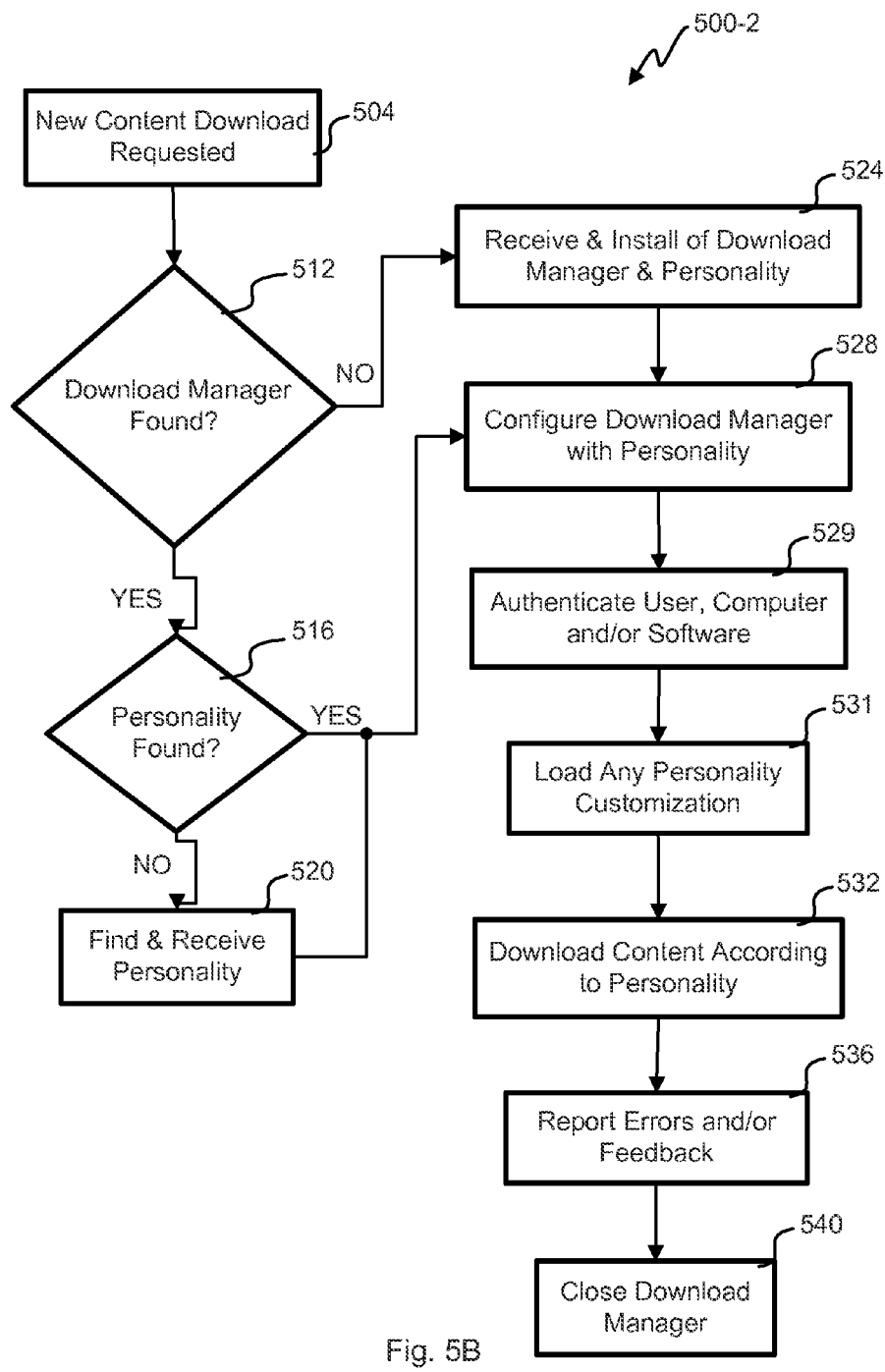

With reference to FIG. 5B, an embodiment of a process 500-2 for using the download manager 416 is shown. This embodiment differs from the embodiment of FIG. 5A by adding two additional blocks between block 528 and block 532 to provide authentication and user customization. From block 528, processing goes to block 529 where the user, computer, software, operating system, etc. is authenticated for the instance of the download manager 416 as specified by the use case. In block 531, any user customization to the personality is overlaid to override default values where permitted. After block 531, processing continues to block 532 for download of the requested content as described in relation to FIG. 5A.

Figure 6A:
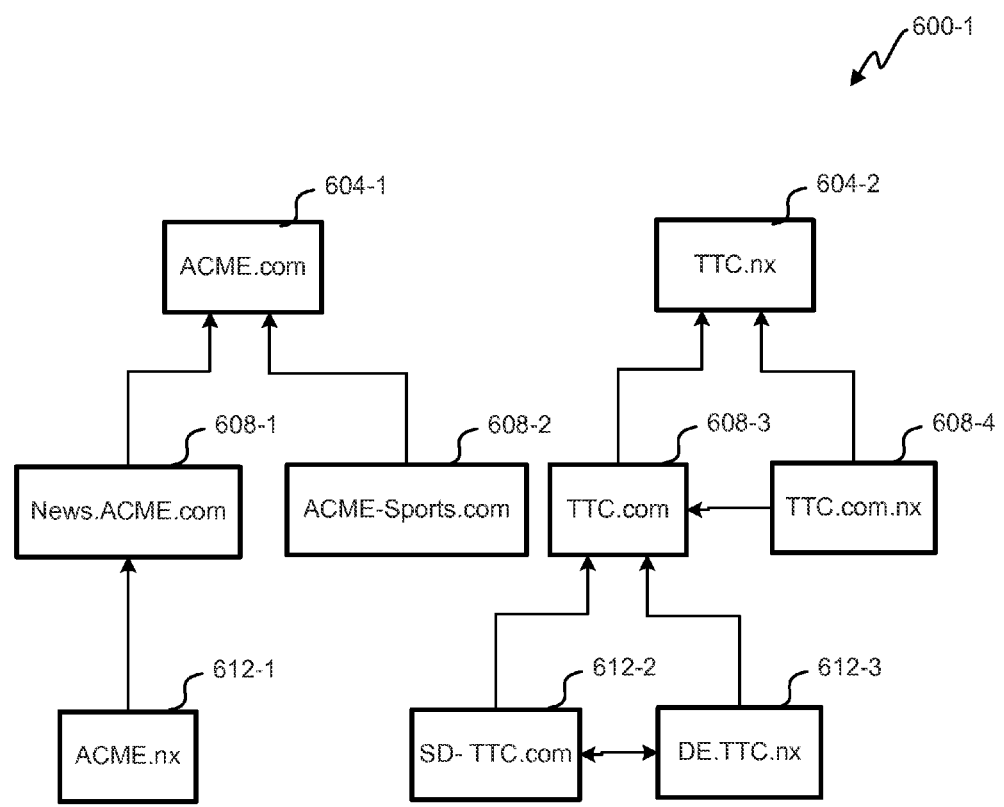
FIGS. 6A and 6B each illustrate a flowchart of an embodiment of a process for report grouping.

Referring next to FIG. 6A, an embodiment of a process 600-10 for error report and/or feedback grouping is depicted. Feedback and error reporting can respectively performed to a single site or to a defined group of sites. These grouped reports can be the same or different for the two types of reporting, namely error and feedback reporting. For example, a group of sites could have different personalities that all report to one or more addresses. A group of sites 408 could each have personalities distributed that report to a group of addresses or domains to send the reports to multiple locations. Feedback can also distributed in this way. A personality may send feedback to one group of locations and error reports to another group of locations, or both groups of locations could be the same for both feedback and error reports.

In the depicted embodiment, a hierarchy could be defined for report grouping. Three generations are shown in this example including grandparent sites 604, parent sites 608 and children sites 612. A grandparent site 604 in the hierarchy group can override the personality settings of the parent and children sites 608, 612 lower in its hierarchy. The lines between blocks show the sites 408 in the same hierarchy. An ancestor could ask for copies of some or all reporting for its progeny. In other embodiments, a site can override personality settings of an ancestor in the hierarchy.

Only grouped sites can share information within the download manager realm for this embodiment. If there is no relationship defined between the sites, the download manager 416 does not allow passing of information. In this way, the download manager 416 can operate the unrelated personalities in different threads or sandboxes. Each thread has one or more sites 408 that are serviced with the thread as defined by the one or more personalities for those sites. This embodiment reports both errors and feedback according to the same hierarchy grouping, but other embodiments could have separate hierarchies for each category of reports.

This example has a defined reporting hierarchy. Each site 408 reports to all siblings and ancestors traceable through the directional arrows. For example, the DE.TTC.nx and SD-TTC.com report to the content provider defined in both their personalities and those defined in the TTC.com and TTC.nx personalities. In another example, the TTC.com.nx site reports to the content provider defined in its personality as well as those defined in the TTC.com and TTC.nx personalities. In a different example, the TTC.com situation only the content publishers defined in the TTC.com and TTC.nx personalities are reported to.

Although this embodiment uses a hierarchy for reporting, other embodiments could use any type of grouping. For example, personalities in a same domain could cross-report.

Figure 6B:
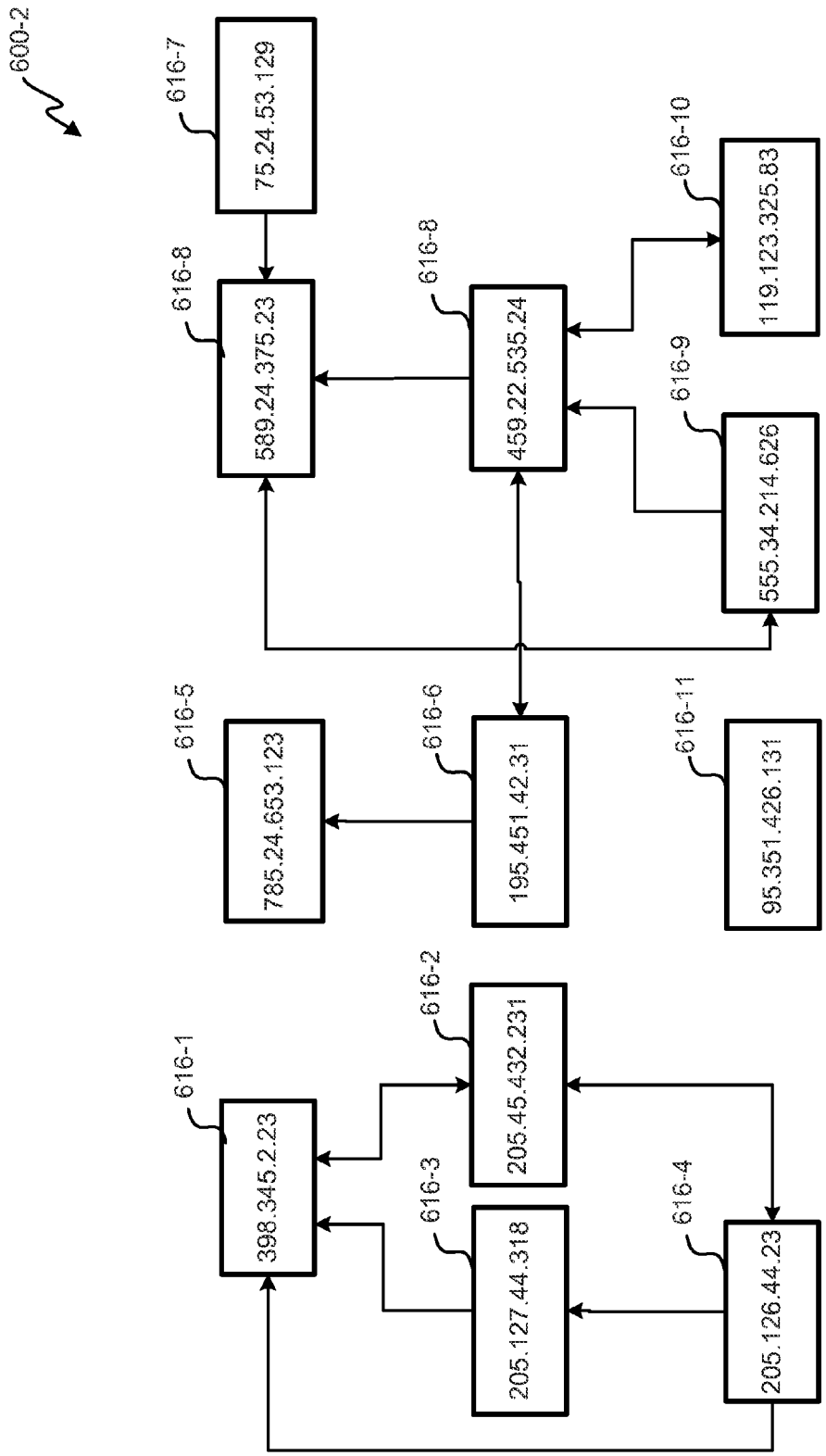

Referring next to FIG. 6B, an embodiment of a process 600-2 for error report and/or feedback grouping is depicted. In this embodiment, reporting is performed by IP address rather than by domain. Reporting and personality sharing is depicted by arrows. For example, the sixth reporting address 616-6 allows the fifth reporting address 616-5 receive its reports. The fourth reporting address 616-4 shares its reports with the first, second and third reporting addresses 616-1, 616-2 and 616-3. The sharing could end with the block one link further in the chain that receives the arrow head or the sharing could proceed further down the chain. For example, the fourth reporting address 616-4 could share information with the third reporting address 616-3 that may be passed to the first reporting address 616-1 in one embodiment or not passed in another embodiment.

Personality sharing may align with report sharing, or not in different embodiments. In one example, the third personality associated with the third reporting address 616-3 could use the personality from the fourth reporting address 616-4. Some embodiments check for a personality before inheriting one from another reporting address 616.

As described above, some embodiments relate to different downloading instances. For example, a first content object may be initially downloaded and second content object may be later downloaded (e.g., following a user's request for the second content object). The content objects may be downloaded using different content-manager instances, and each instance may be customized with a different personality.

Figure 7A:
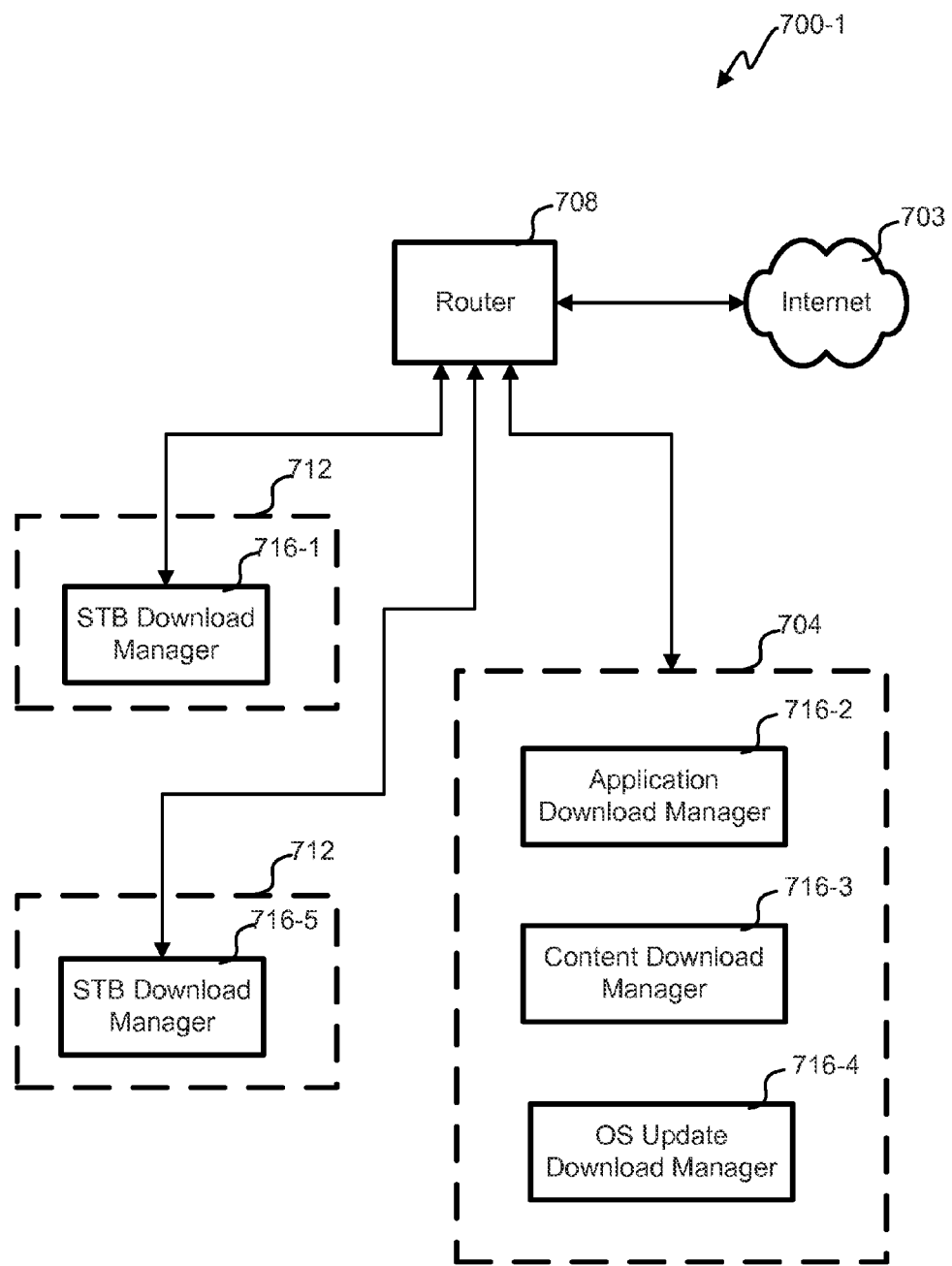
FIGS. 7A and 7B depict block diagrams of embodiments of a local area network (LAN) having a number of download managers.

Referring first to FIG. 7A, an embodiment of a local area network (LAN) 700-1 having a number of download managers 716 is shown coupled to the Internet 703. This embodiment of the system 700-1 is a typical home installation including two set top boxes (STBes) 712 and a personal computer 704. Other embodiments could have any number of computing devices each with one or more download managers. Each of the STBs 712, has a STB download manager 716-1, 716-5 to receive content files through a router 708, which communicates with a wide area network (WAN) or the Internet. The router 708 in this embodiment is also networked to the personal computer 704, which has an application download manager 716-2, a content download manager 716-3, an operating system (OS) download manager 716-4 and possibly other download managers. In various LAN embodiments, each STB 712, video player, music player, personal computer 704, computing device, electronic device can have one or more download managers.

The various download managers 716 each gather information about download tasks that are planned or in operation. The download tasks can be user requested content, scheduled content, delayed downloads or any file or streamed download. Each download manager 716 communicates to other download managers 716 these planned or operational download tasks to allow download tasks to be known among those download managers 716 sharing a download resource. In other words, the planned download task information is gathered and communicated away from each download manager 716 to other download managers to allow coordination of the bandwidth usage on a shared network connection. Collectively, the download managers 716 work together to share the download resources of the network connection in a prioritized manner as will be further described below. Each download manager 716 can discover other download managers 716 on the same LAN and routing information for the upstream network connection can be compared to determine if each is sharing a common Internet or WAN connection.

In this embodiment, the download managers 716 communicate pending and operational download tasks with each other such that each download manager 716 can determine how much of bandwidth to utilize. In another embodiment, a single controller or global politeness coordination function on the local area network (LAN) decides how the bandwidth should be utilized based upon the information about the planned and operational download tasks. The global politeness coordination function may be embedded in a device that acts as a gateway to the Internet or other wide area network, in a router, in another device, or may be a standalone device. In yet another embodiment, each download manager 716 communicates pending and operational download tasks to a global politeness coordination function on the wide area network or Internet that arbitrates how the bandwidth will be utilized for a particular group of download managers. Still another embodiment, allows some download managers to gather the information from other download managers for making a local decision, while other download managers work with a controller on the Internet or LAN to allow remote arbitration.

Figure 7B:
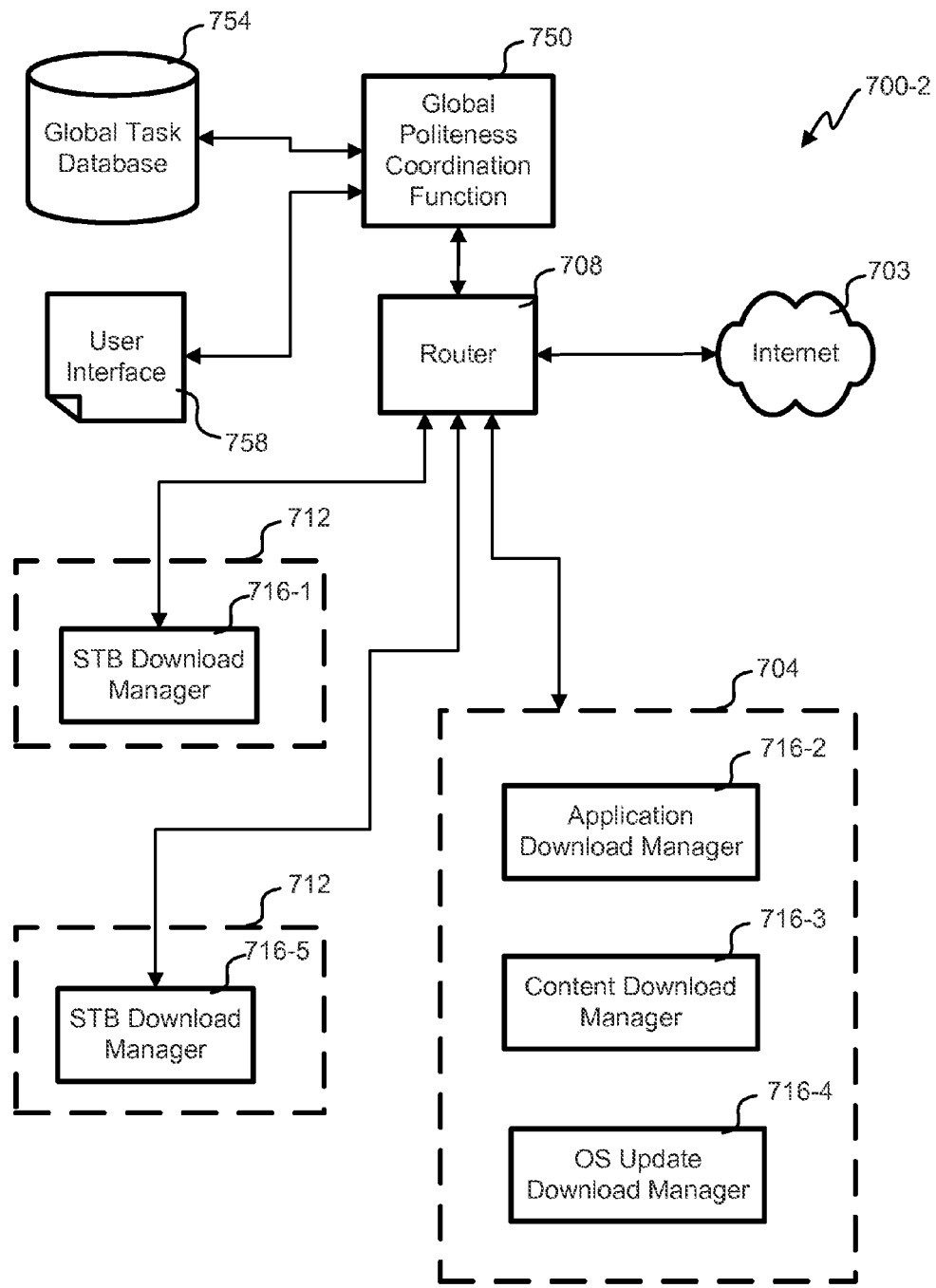

With reference to FIG. 7B, another embodiment of a local area network LAN 700-2 of download managers 716 is shown coupled to the Internet 703. This embodiment uses a point on the LAN 700-2 to arbitrate usage of the Internet connection for some or all of the download managers 716. A global politeness coordination function 750 receives reports from the download managers 716 of download tasks and recent activity/inactivity of the computing device 704, 712. Those reports are stored in a global task database 754. The global politeness coordination function 750 uses the information in the global task database 754 in a politeness algorithm to allocate the Internet connection among the various download managers 716 and other possible consumers of the bandwidth on the LAN 700. Other embodiments could also coordinate usage of bandwidth and resources on the LAN 700.

By having the control point in communication with a network bottleneck such as a router 708, all downstream consumers of the bandwidth can be controlled irrespective of whether the downstream consumer is a download manager 716 with the ability to report download tasks and accept allocations and scheduling. Historical usage of ports/IP addresses can be monitored by the global politeness coordination function 750 to determine the typical and maximum usage of the Internet connection. That usage is stored in the global task database 754. Other embodiments could embed the global politeness coordination function 750, the global task database 754 and user interface 758 in the router 708 itself or could have a separate appliance to host these functions.

A user interface 758 could be a web or application interface that allows interaction with the global politeness coordination function 750. The user interface 758 could report allocations and schedules of the upstream bandwidth between the LAN and the WAN. Occasional testing could be used to recalibrate what bandwidth is likely to be available for allocation. Any variances over past days and weeks could be noted to estimate what current bandwidth is likely to be. Download managers 716 could report when the allocated bandwidth cannot be achieved, which could trigger the global politeness coordination function 750 to lower its estimate of available bandwidth. Some allocations could be reduced to provide for streaming or other download tasks less able to operate adequately with lower bandwidth.

Interaction with the user interface 758 also allows control of the bandwidth and other network resources. Allocations of bandwidth and total bandwidth consumption over any time period can be specified through the user interface 758. For example, a fraction of the bandwidth, a datarate cap and/or a metering cap could be specified. The control could be for an IP address and/or ports. Some embodiments could control consumption for a range of IP addresses and/or ports. Instead of IP address, some embodiments could control based upon MAC address, domain or URI.

The user interface 758 could further be used to report historical usage and current download tasks. Any unserved or underserved tasks could also be reported. In some embodiments, reports on the type of usage could also be tracked. For example, recognized web services and protocols could be noted.

For consumers of the bandwidth without the intelligence to report and accept commands, allocations can be done presuming similar usage to past usage when activity is sensed on a particular port and/or IP address. Further, the protocol of the usage can be analyzed to determine if the protocol is likely to allow constraint of the Internet connection without unacceptable quality of service (QoS). For example, a particular VoIP protocol may be discerned to need 100 Kbps because of the port used and packets. Future use consistent with past use would also be allocated 100 Kbps.

Figure 8A:
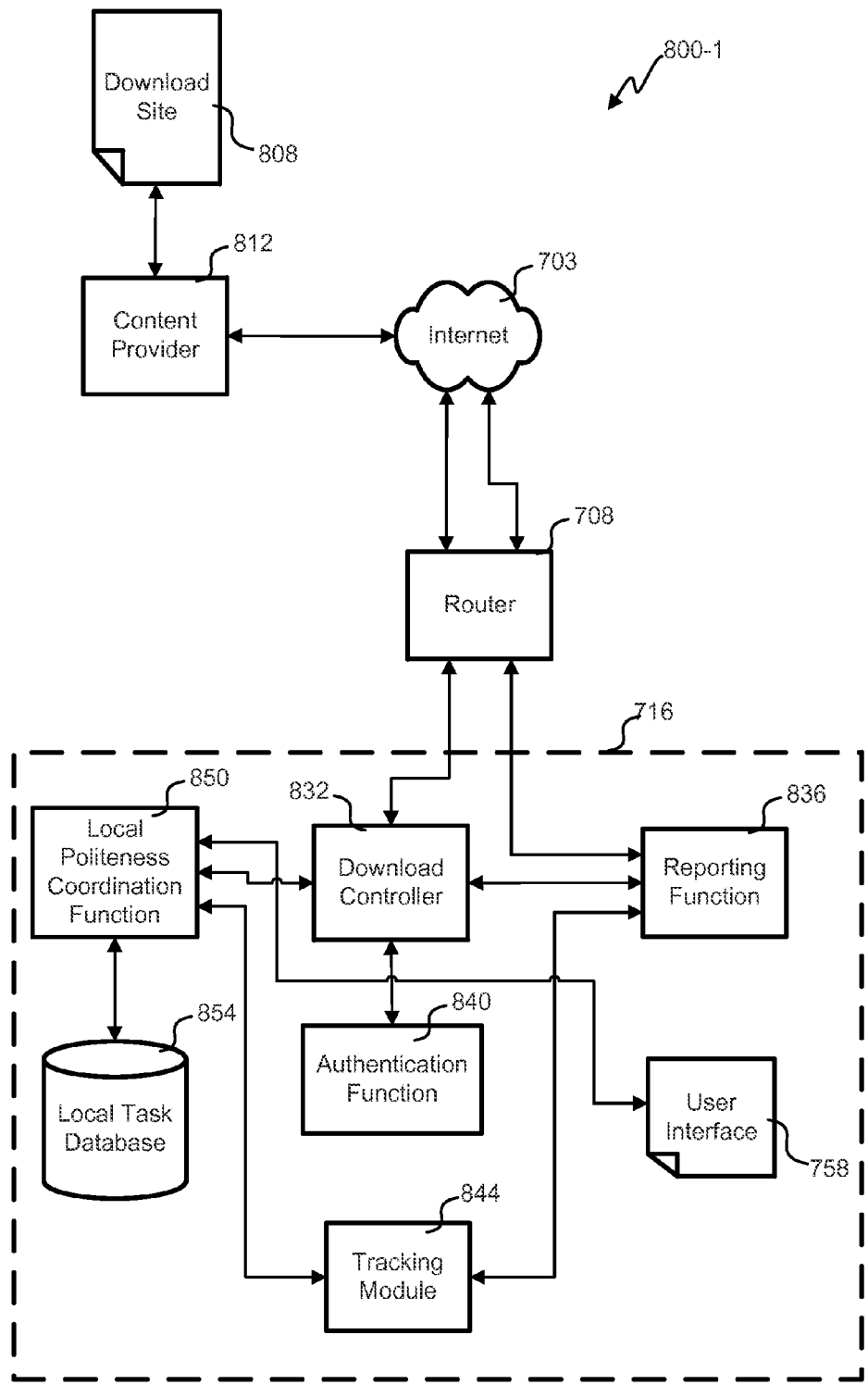
FIGS. 8A, 8B and 8C depict block diagrams of embodiments of a download system.

With reference to FIG. 8A, an embodiment of a download system 800-1 is shown. Included in the download system 800 are one or more content provider(s) 812 and one or more download managers 716. For simplicity sake, only a single download manager 716 and a single content provider 812 are shown, but it is to be understood that there would typically be many of each. A download controller 832 manages operation of the download manager 716. Configuration can be done and status is available with the user interface 758.

Instances of the download manager 716 are installed on computing devices 704 to facilitate download of content from various content providers 812. One instance of the download manager 716 can operate with any number of content providers 812. Various instances of the download manager 716 may be used cross-platform for any number of phones, personal digital assistants, media playing software or hardware, portable computers, desktop computers, set top boxes, personal video recorders, optical disc players, IP TV set tops, Internet radio, and/or other content realizing devices.

A tracking module 844 provides the ability to gather error reports, feedback, computer usage/inactivity and download task information. The information gathered and reported to all other local politeness functions 850 can be programmable. A reporting function 836 knows where to upload tracked information. In this embodiment, the local politeness coordination function 850 and all others on the LAN receive the tracked information. The download managers 716 find each other with automatic discovery.

The local politeness coordination function 850 stores the tracked information in a local task database 854. As all the other download managers 716 report their tracked information, the local politeness coordination function 850 can make decisions on how to consume the bandwidth to the WAN. One of the local politeness coordination functions 850 can be designated to make the decisions for the whole LAN, for multiple LANs, for a physical or logical subset or segment of the LAN, or the decision could be made in a distributed manner. In any event, all the local politeness coordination functions 850 act in concert to allocate and schedule the bandwidth in this embodiment.

The download manager 716 also includes an authentication function 840 in this embodiment. Users of the download manager 716 may have a user identifier (ID) and/or password depending on whether any authentication and/or authorization checks are required by the download manager 716. Where authentication is specified, the user enters a user ID once, periodically or every time the download manager 716 is invoked. Each user could have separate user IDs. The user IDs are unique within the realm of use case run on any number of computers, but could be overlapping when considering all users and use cases together. For example, one download manager 716 could have the user ID "WilliamBoy2", which would be unique to all other download managers. Another download manager could have the same WilliamBoy2 user ID to correspond to the same or a different user.

The bandwidth available could be divided among the various download managers 716 sharing the LAN 700. For example, the computer may have 300 Kbps of available bandwidth. The download manager 716 could avoid or share use of the bandwidth to provide for other applications of the user computer. With the available bandwidth, some downloads could be given priority. For example, a streaming download of a live event could receive priority over a file download with little QoS requirements. The download manager 716 could go through a process of meeting minimum QoS requirements first to avoid stuttering of streamed content and divide the remaining portion of the bandwidth among the other downloads. A portion of the bandwidth could be reserved from use by the download manager 716 to provide for other applications, for example, the download manager could be limited to 80% of the bandwidth in one embodiment.

A politeness algorithm has awareness of the likely needs of the various download managers 716 in the LAN 700. In various embodiments, the politeness algorithm may execute in a distributed fashion, in the router, on the WAN or in another location coupled to the LAN. Specific download tasks are known by the politeness algorithm such that the bandwidth can be divided up in a reasonable manner. Download managers can optionally communicate the tasks and any quality of service (QoS) parameters. For example, a streaming program experienced live might take priority over a background download. The below table shows a number of download tasks for a given LAN 700 in one example.

TABLE

Download Tasks Across Download Managers in LAN

| Computing Device | Task Type | Requested Bandwidth | Allocated Bandwidth |
|---|---|---|---|
| PVR Download Manager | Stream of Video | 450 Kbps | 450 Kbps |
| | Download of Video | 1.5 Mbps | 100 Kbps |
| | Download of Software | 350 Kbps | 50 Kbps |
| Radio Download Manager | Stream of Audio | 50 Kbps | 50 Kbps |
| VOIP Phone | Duplex Streaming | 100 Kbps | 50 Kbps |
| Unknown With Activity | Unknown | NA | 100 Kbps |
| Unknown Without Activity | Unknown | NA | 20 bps |

When a computing device is initially powered-on or reactivated, a certain amount of bandwidth is reserved by the politeness algorithm. The download manager 716 may report becoming active after booting or wake-up. Until a period of time after the recent activation/re-activation expires, the politeness algorithm reserves bandwidth. If none is consumed or if it is consumed at a rate less than the allocation, the reserved bandwidth is scaled back. Conversely, the bandwidth allocation can be scaled-up when the bandwidth is requested and consumed by the computing device.

Some use of the Internet connection is not from a download manager or other software that is designed to provide information to request bandwidth expressly. In the table, these are denoted as "Unknown" and an indication on whether there is current activity. A default amount of 100 Kbps is given these unknown requesters when one is actively requesting content and 20 Kbps is reserved even when no requesting is currently happening. If the default amount is not saturating the requests and the requester cannot be characterized, the bandwidth can be scaled until that happens to characterize the maximum bandwidth of the requester. Resources permitting, the maximum bandwidth can be made available. Characterizations can be stored so that future activity from an unknown requester can be accommodated more efficiently in this embodiment.

A fraction of the total bandwidth is reserved by the politeness algorithm for tasks other than those of the download managers 716. The politeness algorithm may or may not know of the planned usage of the bandwidth by other applications and processes. Where the information on the planned usage of the bandwidth can be gathered, the information is communicated to the politeness algorithm. If the information cannot be gathered, it is estimated. Where there is no visibility into usage of a browser, for example, how recently the computer has booted or been used after booting can be determined and communicated to the politeness algorithm. Where a computer is being used or recently has been booted, a fraction of the total bandwidth is allocated to that computer for unforeseen bandwidth consuming tasks. As bandwidth is consumed by the computer, more bandwidth can be allocated to the computer until the application(s) other than the download managers 716 are satisfied. For computers that have not been recently used, the fraction allocated to unexpected or unknown tasks can be scaled back over time.

Although an express request from a download manager 716 has a requested amount of bandwidth, the information provided can be more complex in other embodiments. The express request could have minimum, maximum and adequate bandwidth requests to allow the global politeness coordination function 750 more options in providing an allocation. Before an allocation, there can be a proposal or a number of proposals from which the download manager 716 can automatically choose or the user can manually select. For example, the global politeness coordination function 750 could offer to allocate the minimum bandwidth request immediately or the maximum bandwidth request if the allocation can be delayed by forty seconds.

In some cases, the download tasks cannot be scheduled to allocate the bandwidth necessary. Rather than under allocating multiple tasks, the politeness algorithm will choose some download managers 716 to receive their full allocation, while denying the full allocation to the minimum number of tasks. For example, the upstream bandwidth could be 1 Mbps. There could be four streaming tasks requiring 320 kbps. Rather than degrading the quality of all four download tasks providing globally bad QoS. Three receive full bandwidth and the fourth receives only 40 Kbps, which is the remainder. In other cases, the fourth download task could be given no bandwidth and an optional message could be displayed to the user by the download manager 716 indicating the problem. The displayed message could indicate when the active download tasks are scheduled to complete and to please try the request later, for example. The fourth download task could be automatically reinitiated or manually reinitiated once enough of the active download tasks complete to provide the necessary bandwidth.

Figure 8B:
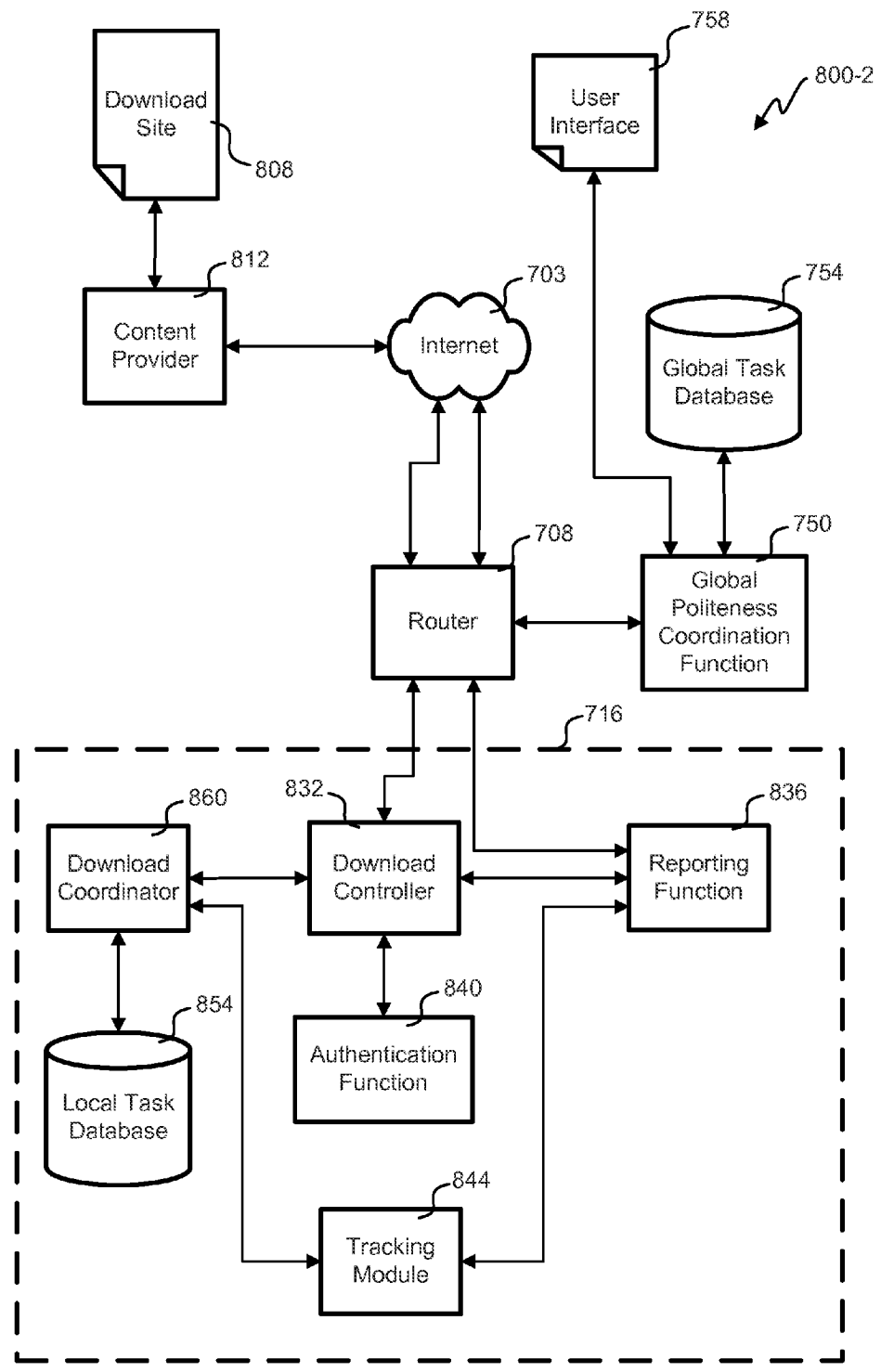

Referring next to FIG. 8B, another embodiment of the download system 800-2 is shown. This embodiment uses a global politeness coordination function 750 on the LAN to manage consumption of the upstream bandwidth as described in relation to FIG. 7B above. The global politeness coordination function 750 can include hardware and/or software that can be in a separate appliance or embedded into the router 708. The politeness algorithm would operate in the global politeness coordination function 750 with information gathered from all download mangers 716 that are downstream from the router 708. A download coordination function 260 stores download tasks in a local task database 854 for reporting to the global politeness coordination function 750. Scheduling, allocation and status can also be stored in the local task database 854.

Figure 8C:
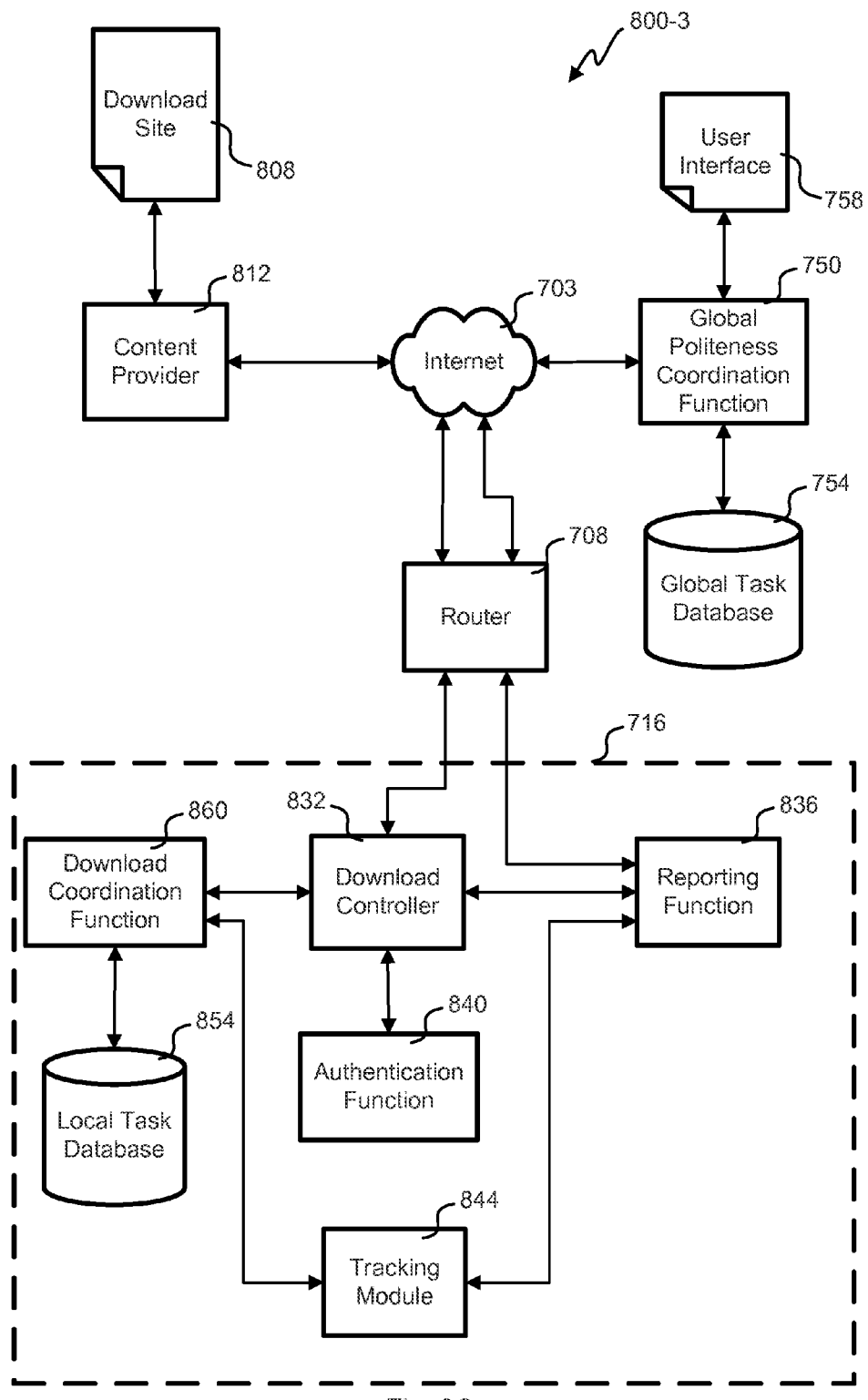

With reference to FIG. 8C, another embodiment of the download system 800-3 is shown. This embodiment uses a global politeness coordination function 750 that is located on the Internet or WAN upstream from the router 708. For example, the global politeness coordination function 750 could be in a neighborhood hub, a central office, a headend, a gateway, etc. The global politeness coordination function 750 can control one or more LANs 700. Reports of download tasks can be sent by the various download managers 716 over the Internet 703. In some embodiments, the global politeness coordination function 750 can artificially cap the upstream bandwidth by lowering the amount of bandwidth it will allocate. The router 708 enforces the allocation.

Some embodiments could allow an Internet service provider (ISP) regulate QoS to have premium levels of service or to enforce a fair access policy (FAP) with the global politeness coordination function 750. Download managers 716 could be regulated that premium users are provided a minimum QoS when an Internet connection is oversubscribed. When other users violate the FAP, their download managers and/or other bandwidth consumers could be throttled back to not use as many resources.

Figure 9:
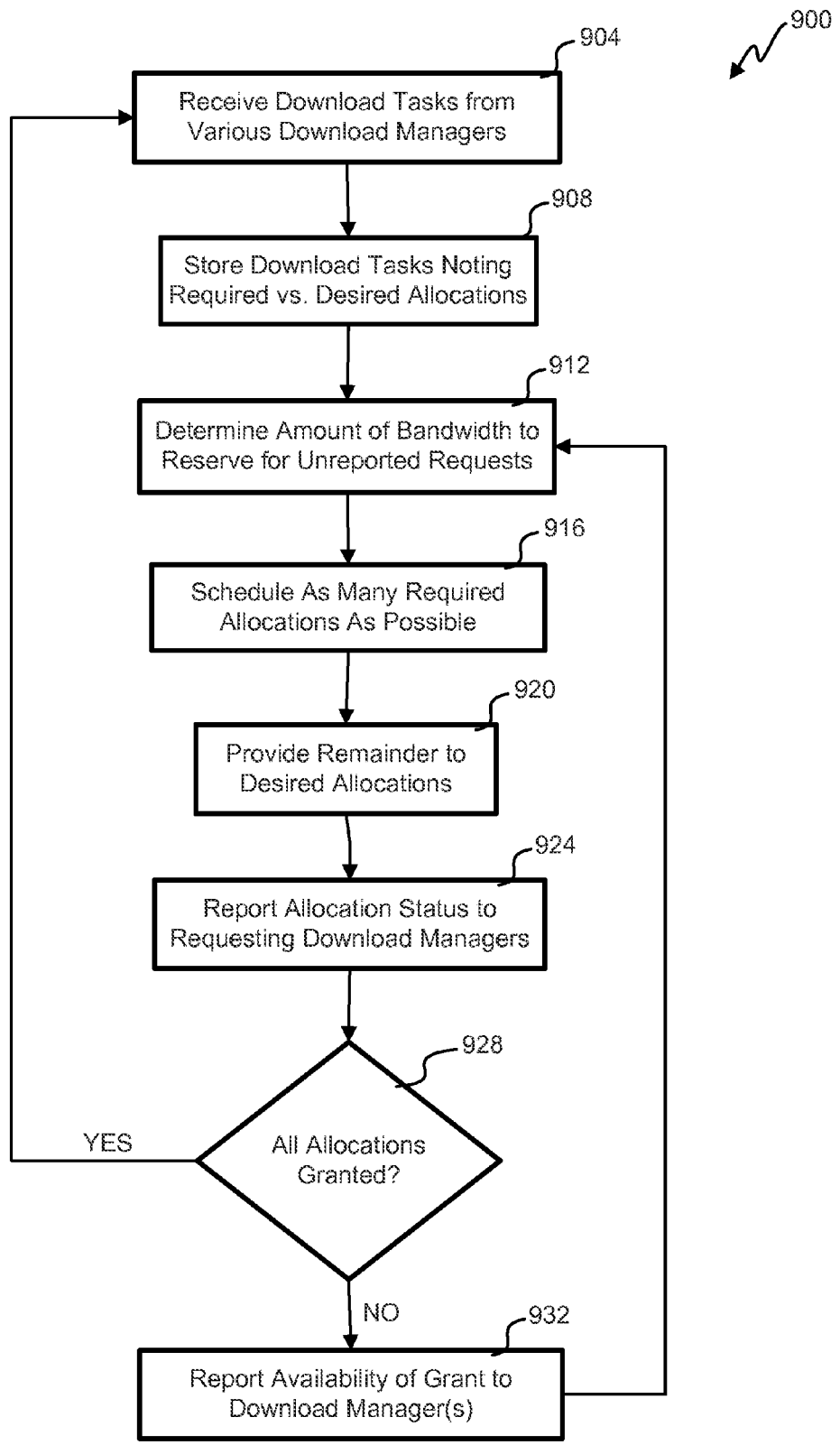
FIG. 9 illustrates a flowchart of an embodiment of a process for managing bandwidth consumption on a LAN.

Referring next to FIG. 9, an embodiment of a process 900 for managing bandwidth consumption for a LAN 700 is shown. Embodiments could use a similar process to manage a number of LANs from an upstream point. The depicted portion of the process begins in block 904 where the download tasks are received from the various download managers 716 managed by a global politeness coordination function. A local and/or global task database 854, 754 stores the tasks in block 908. The required and desired allocations are noted in the database 854, 754. Required allocation is the amount needed before degradation in stream becomes noticeable. In some cases, a deadline for download may also dictate a schedule and/or allocation.

In block 912, the amount of bandwidth to reserve for unreported request is determined. This may include observation of usage, historical observations and/or analysis of computers recently booted or in-use. As many required allocations or schedules are met in block 916. If a required allocation or schedule cannot be wholly accepted, it may be rejected entirely in some embodiments. The remaining bandwidth is allocated to any desired allocations in block 920. This portion of the bandwidth can be oversubscribed in some embodiments where any required allocations are not active. The status of the allocation process is reported to all the download managers 716 in block 924. The download managers 716 receiving the allocation can begin or continue the consumption of the bandwidth after grant. Should allocation be exceeded because of a download manager 716 operating improperly, the bandwidth can be throttled by the router 708 and/or the global politeness coordination function 750.

If all allocations are granted as determined in block 928, processing loops back to block 904 to process more download tasks as they are received. Where some download tasks are denied, processing goes from block 928 to block 932. The availability is reported to download managers 716 in block 932. This report could indicate when bandwidth will become available in the future such that the request process can be retried. The download manager 716 could optionally provide acceptance/denial status to the user. Processing loops back from block 932 to block 912 after the reporting.

If all accepted tasks are allocated with adequate QoS, some embodiments could allocate additional bandwidth to the unreported requests and/or reported requests to maximize usage. For example, a 1 Mbps Internet connection could have three express requests for 400 Kbps and one unreported request estimated to be 100 Kbps. Two express requests and the one unreported request are granted, but one 400 Kbps express request that is not. Any of the three granted requests could be given the unused 100 Kbps before the Internet connection saturates. Some embodiments could split the additional bandwidth among the three granted requests.

A number of variations and modifications of the disclosed embodiments can also be used. For example, the above embodiments speak in terms of regulation of downstream usage of the Internet connection. Other embodiments could use the same principles to regulate upstream usage of the Internet connection. Further, other embodiments could regulate usage of any WAN connection, which may or may not be an Internet connection. Further, it will be appreciated that disclosed embodiments can be combined. For example, different document managers can be used to download initially requested content and additional content. As another example, download of the content and of the additional content can be prioritized according to, e.g., a prioritization and/or politeness coordination function.

While the principles of the invention have been described above in connection with specific apparatuses and methods, it is to be clearly understood that this description is made only by way of example and not as limitation on the scope of the invention.

What is claimed is:

1. A method for temporarily customizing a download manager on a user computer with different personalities corresponding to each of a plurality of use cases, each personality specifying a plurality of parameters of the download manager, wherein the parameters specify temporary operation of the download manager, each use case corresponding to a combination of a content provider and a download source, the method comprising:
   downloading the download manager to the user computer;
   determining a selected use case based on a selected combination of a content provider and a download source;
   determining that a personality that corresponds to the selected use case is not stored on the user computer;
   downloading the personality to the user computer based on the determination that the personality is not stored on the user computer;
   temporarily customizing the download manager by applying the parameters specified by the personality; and
   downloading content from the download source to the user computer, while the download manager is customized with the personality,
   wherein the selected use case is one of the plurality of use cases.

2. The method for customizing the download manager on the user computer as recited in claim 1, wherein the personality specifies parameters that limit an amount of bandwidth that will be consumed from available bandwidth, while downloading the content.

3. The method for customizing the download manager on the user computer as recited in claim 1, wherein:
   the content is a stream.

4. The method for customizing the download manager on the user computer as recited in claim 1, wherein:
   the personality specifies a first one of the parameters that can be customized by a user, and
   a second one of the parameters that cannot be customized by the user.

5. The method for customizing the download manager on the user computer as recited in claim 1, wherein the parameters specified by the personality control the download manager's implementation of at least one of:
   bandwidth requirement(s),
   QoS factor(s),
   reporting location(s),
   authentication requirement(s),
   player or application to use with the content,
   how a graphical user interface is customized,
   information to track,
   location for download of the content,
   security and/or privacy settings,
   how customizations are inherited,
   download protocol, and/or
   encryption to be used.

6. The method for customizing the download manager on the user computer as recited in claim 1, wherein:
   the personality specifies one or more of the parameters that direct the download manager to gather information for reporting to a location.

7. A file download system for electronically transmitting content files to a user computing device using the Internet, the file download system comprising:
   one or more content distributors that are at least partially implemented as hardware,
      the one or more content distributors comprising one or more content providers and one or more download sites,
      the one or more content providers and the one or more download sites supporting a plurality of use cases, each use case corresponding to a combination of a content provider and a download source; and
   a download manager that is downloadable to the user computing device, wherein the download manager comprises:
      a personality database that stores a plurality of downloadable personalities, each of the downloadable personalities corresponding to a different one of the plurality of use cases, wherein each of the plurality of downloadable personalities specifies a plurality of parameters that specify temporary operation of the download manager, and is invoked independently by the user computing device to temporarily customize a particular instance of the download manager on the user computing device when the user computing device requests content representing a corresponding one of the plurality of use cases; and
      a reporting function that reports to different locations as defined by the plurality of downloadable personalities;
   wherein the download manager is configured to:
   determine a content provider and a download source corresponding to a download request;
   determine based on the combination of the content provider and the download source, a corresponding use case of the plurality of use cases;
   determine whether a corresponding personality for the corresponding use case is stored in the personality database; and
   based on a determination that the corresponding personality is not stored in the personality database,
      download the corresponding personality and storing the corresponding personality in the personality database; and
   apply the corresponding personality to temporarily customize the download manager.

8. The file download system for electronically transmitting content files to the user computing device using the Internet as recited in claim 7, wherein a type of content is used to determine a personality, from the plurality of downloadable personalities, to be used by the user computing device.

9. The file download system for electronically transmitting content files to the user computing device using the Internet as recited in claim 7, wherein metadata within requested content from one of the one or more content distributors specifies which personality, from the plurality of downloadable personalities, is to be used by the user computing device.

10. The file download system for electronically transmitting content files to the user computing device using the Internet as recited in claim 7, further comprising an authentication function that enables a corresponding content provider to attribute a corresponding instance of the download manager to a particular account.

11. A file download manager, stored on a non-transitory computer readable storage medium, for managing electronic transmission of content files to a user computing device over the Internet, the file download manager comprising:
- a download controller;
- a personality database that stores a plurality of downloadable personalities,
  - each of the downloadable personalities corresponding to a different one of a plurality of use cases, each use case corresponding to a combination of a content provider and a download source,
  - wherein each of the plurality of downloadable personalities specifies a plurality of parameters that specify temporary operation of the download manager, and is invoked independently by the user computing device to temporarily customize a particular instance of the file download manager on the user computing device when the user computing device requests content representing a corresponding one of the plurality of use cases; and
- a reporting function that reports to different locations as defined by the plurality of downloadable personalities,
- wherein the download manager is configured to:
  - determine a content provider and a download source corresponding to a download request;
  - determine based on the combination of the content provider and the download source, a corresponding use case of the plurality of use cases;
  - determine whether a corresponding personality for the corresponding use case is stored in the personality database; and
  - based on a determination that the corresponding personality is not stored in the personality database,
    - download the corresponding personality and storing the corresponding personality in the personality database; and
  - apply the corresponding personality to temporarily customize the download manager.

12. The file download manager for managing electronic transmission of content files to a user computing device over the Internet as recited in claim 11, wherein each of the downloadable personalities specifies a parameter that limits an amount of bandwidth that will be consumed from available bandwidth, while downloading the content representing the corresponding use case.

13. The file download manager for managing electronic transmission of content files to a user computing device over the Internet as recited in claim 11, wherein the download controller uses multiple personalities while downloading content simultaneously.

14. The file download manager for managing electronic transmission of content files to a user computing device over the Internet as recited in claim 11, wherein a type of content is used to determine a personality to use from the plurality of downloadable personalities.

15. The file download manager for managing electronic transmission of content files to a user computing device over the Internet as recited in claim 11, wherein metadata within requested content specifies which personality from the plurality of downloadable personalities to use.

16. The file download manager for managing electronic transmission of content files to a user computing device over the Internet as recited in claim 11, further comprising a tracking module that monitors download controller usage by a particular personality and reports the usage to the reporting function.

\* \* \* \* \*